United States Patent
Guan et al.

(10) Patent No.: US 7,580,159 B2
(45) Date of Patent: Aug. 25, 2009

(54) METHOD, PROGRAM, AND APPARATUS FOR PREVENTING A REPRODUCTION OF AN ANTI-COPY DOCUMENT, AND A MEDIUM STORING THE PROGRAM

(75) Inventors: Haike Guan, Kanagawa-ken (JP); Yasushi Abe, Kanagawa-ken (JP); Takashi Saitoh, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1130 days.

(21) Appl. No.: 10/623,603

(22) Filed: Jul. 22, 2003

(65) Prior Publication Data

US 2005/0078331 A1    Apr. 14, 2005

(30) Foreign Application Priority Data

| Jul. 23, 2002 | (JP) | 2002-213761 |
| Jan. 15, 2003 | (JP) | 2003-007111 |
| Feb. 26, 2003 | (JP) | 2003-049492 |

(51) Int. Cl.
*H04N 1/40* (2006.01)
*G06K 9/62* (2006.01)

(52) U.S. Cl. .................. 358/3.28; 358/1.14; 382/218

(58) Field of Classification Search ............ 358/1.14, 358/3.28, 464, 468; 382/135, 137, 217, 218, 382/100; 399/366; 283/73, 113, 902; 235/494
See application file for complete search history.

(56) References Cited

U.S. PATENT DOCUMENTS

| 5,481,378 | A | * | 1/1996 | Sugano et al. | 358/501 |
| 5,647,010 | A | * | 7/1997 | Okubo et al. | 382/100 |
| 5,659,628 | A | | 8/1997 | Tachikawa et al. | |
| 6,580,804 | B1 | | 6/2003 | Abe | |
| 6,901,236 | B2 | * | 5/2005 | Saitoh et al. | 399/366 |
| 7,149,451 | B2 | * | 12/2006 | Uchida et al. | 399/81 |
| 7,227,661 | B2 | * | 6/2007 | Matsunoshita | 358/1.15 |
| 7,245,740 | B2 | * | 7/2007 | Suzaki | 382/100 |
| 2001/0040978 | A1 | | 11/2001 | Abe | |
| 2004/0184065 | A1 | * | 9/2004 | Guan et al. | 358/1.14 |
| 2004/0258276 | A1 | * | 12/2004 | Ishii et al. | 382/100 |
| 2005/0041263 | A1 | * | 2/2005 | Ishikawa et al. | 358/1.14 |

(Continued)

FOREIGN PATENT DOCUMENTS

JP    02029679 A  *  1/1990

(Continued)

OTHER PUBLICATIONS

U.S. Appl. No. 10/227,743.

(Continued)

*Primary Examiner*—Scott A Rogers
(74) *Attorney, Agent, or Firm*—Dickstein Shapiro LLP

(57) ABSTRACT

An image processing apparatus includes a first pattern detecting mechanism, a memory, and a pattern identity determining mechanism. The first pattern detecting mechanism detects a background dot pattern embedded in a background image included in image data of an original image from the image data. The memory stores an anti-copy background dot pattern. The pattern identity determining mechanism compares the detected background dot pattern with the anti-copy background dot pattern stored in the memory and determines that the detected background dot pattern is substantially identical to the anti-copy background dot pattern stored in the memory.

34 Claims, 14 Drawing Sheets

U.S. PATENT DOCUMENTS

| | | | |
|---|---|---|---|
| 2005/0052682 A1* | 3/2005 | Ishikawa et al. | 358/1.14 |
| 2005/0058476 A1* | 3/2005 | Murakami | 399/366 |
| 2005/0151989 A1* | 7/2005 | Shimura et al. | 358/1.14 |
| 2005/0151990 A1* | 7/2005 | Ishikawa et al. | 358/1.14 |
| 2005/0152006 A1* | 7/2005 | Abe et al. | 358/3.28 |
| 2005/0190411 A1* | 9/2005 | Ohno | 358/3.28 |
| 2005/0219634 A1* | 10/2005 | Murakami | 358/3.28 |
| 2006/0256362 A1* | 11/2006 | Guan et al. | 358/1.14 |
| 2007/0003341 A1* | 1/2007 | Guan et al. | 399/366 |
| 2007/0041608 A1* | 2/2007 | Maeno | 382/100 |

FOREIGN PATENT DOCUMENTS

| | | |
|---|---|---|
| JP | 06-125459 | 5/1994 |
| JP | 07-036317 | 2/1995 |
| JP | 07-087309 | 3/1995 |
| JP | 09-164739 | 6/1997 |
| JP | 09164739 A * | 6/1997 |
| JP | 2001-086330 | 3/2001 |
| JP | 2001069340 A * | 3/2001 |
| JP | 2001130124 A * | 5/2001 |
| JP | 2001-197297 | 7/2001 |
| JP | 2001346032 A * | 12/2001 |
| JP | 2002112356 A * | 4/2002 |
| JP | 2002112357 A * | 4/2002 |
| JP | 2002305646 A * | 10/2002 |

OTHER PUBLICATIONS

U.S. Appl. No. 09/583,603.
U.S. Appl. No. 08/847,107.
U.S. Appl. No. 08/539,334.
U.S. Appl. No. 08/241,999.
U.S. Appl. No. 08/211,266.
U.S. Appl. No. 08/211,433.

\* cited by examiner

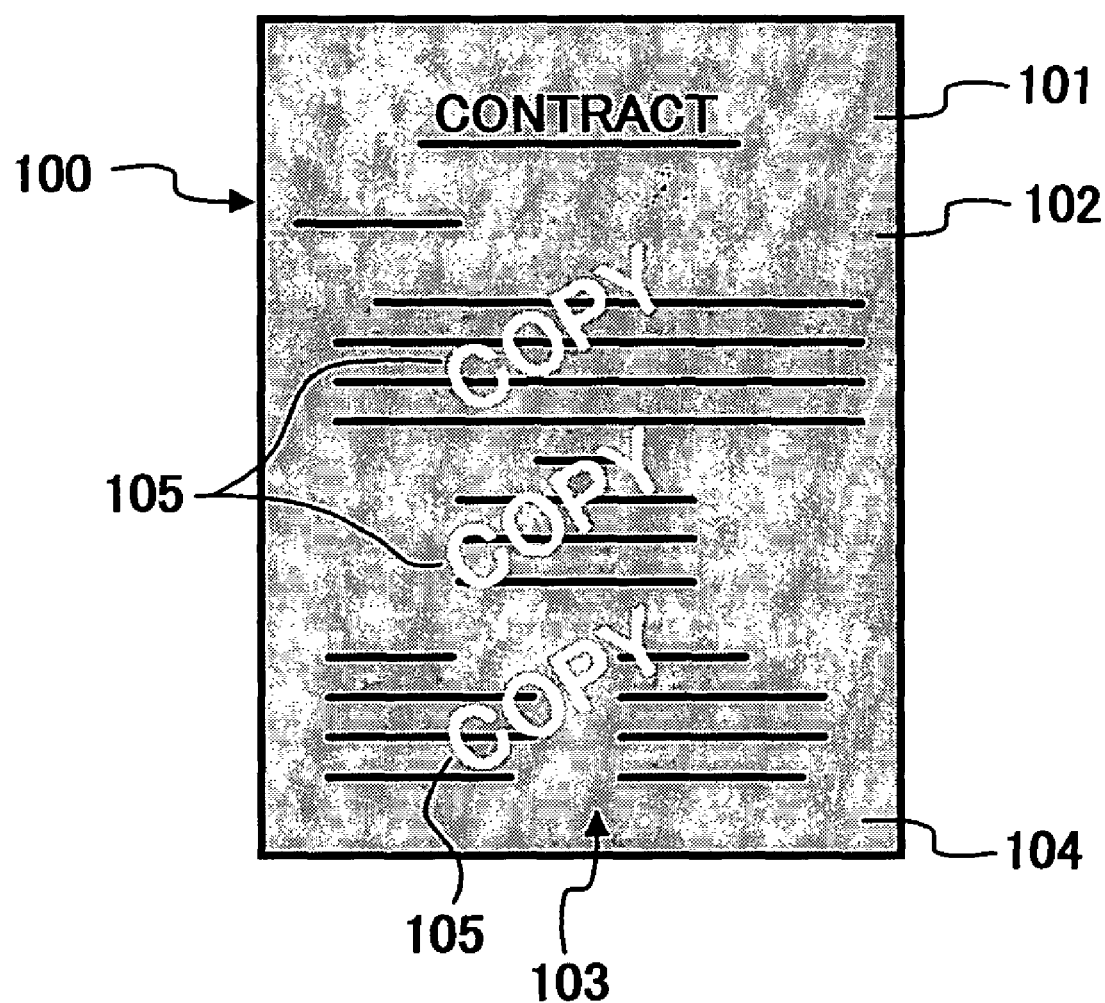

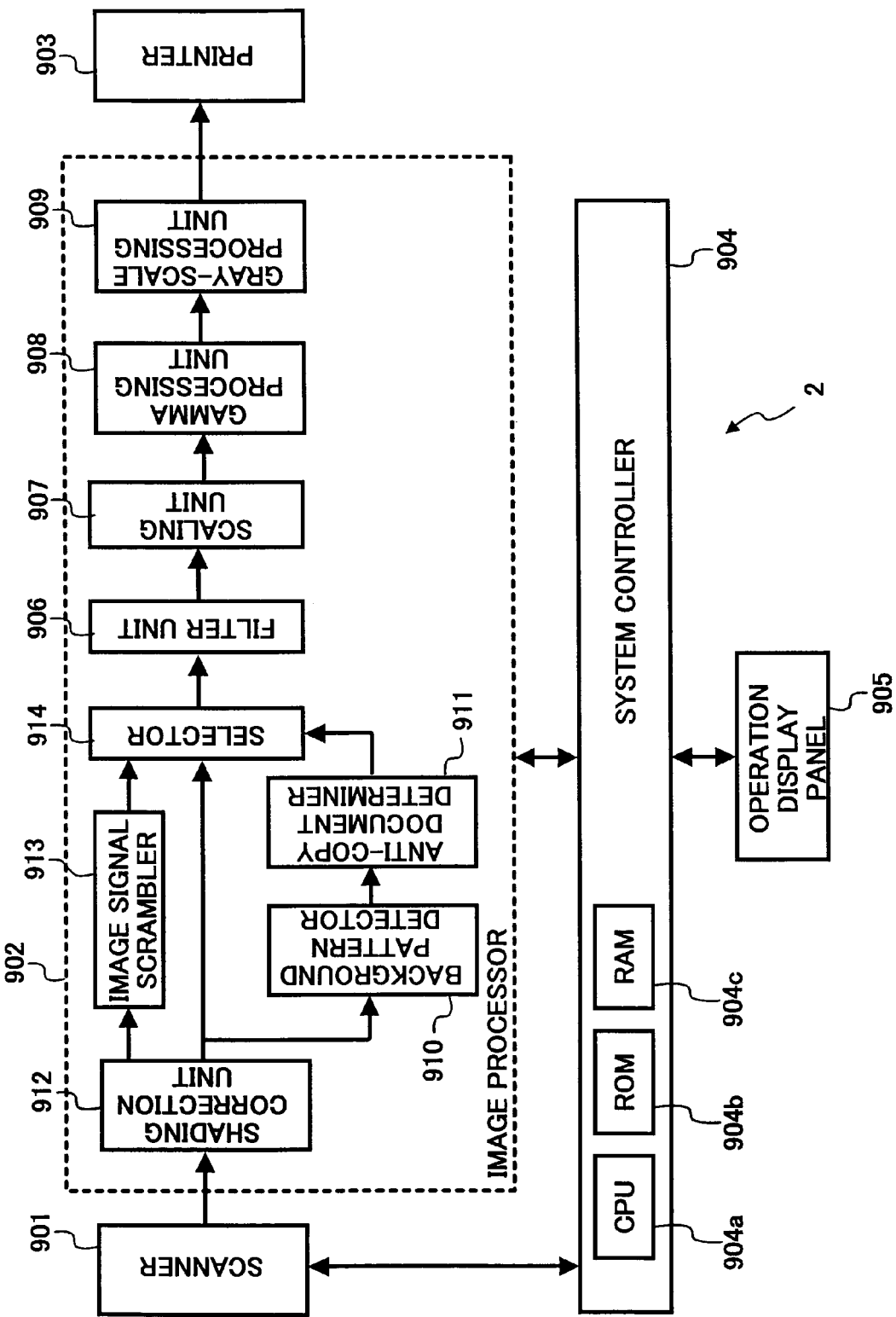

| FIG. 12A |
| FIG. 12B |

METHOD, PROGRAM, AND APPARATUS FOR PREVENTING A REPRODUCTION OF AN ANTI-COPY DOCUMENT, AND A MEDIUM STORING THE PROGRAM

This patent specification is based on Japanese patent applications, No. 2002-213761 filed on Jul. 23, 2002, No. 2003-007111 filed on Jan. 15, 2003, and No. 2003-049492 filed on Feb. 26, 2003, in the Japan Patent Office, the entire contents of which are incorporated by reference herein.

FIELD OF THE INVENTION

The present invention relates to a method, program, and apparatus for copy protection, and more particularly to a method, program, and apparatus for detecting an anti-copy document and prohibiting reproduction of it. The present invention also relates to a data medium storing the above-mentioned program for detecting an anti-copy document and prohibiting reproduction thereof.

BACKGROUND OF THE INVENTION

With recent improvements in image processing and image forming technologies, it has become possible that a high-tech digital color copying apparatus, for example, can reproduce a monetary document with high fidelity such that the reproduced image is hardly distinguishable from the original. Monetary documents include paper currency, securities, and the like, for example, and cannot normally be copied since unauthorized monetary document reproduction is illegal. Therefore, the high-tech digital color copying apparatus requires a feature that prevents high fidelity reproduction of an anti-copy document such as a monetary document, a confidential document, etc. With this feature, reproduction of an anti-copy document may be prevented entirely or can be affected such that the resulting copy is unreadable, for example.

Many confidential documents besides monetary documents are not intended for unrestricted reproduction or copying, such as documents that include trade secrets. These documents require copy protection to prevent unauthorized reproduction using high-tech digital color copying apparatus.

Under these circumstances, various techniques have been used with the above-mentioned high-tech digital color copying apparatus in an attempt to restrict unauthorized image reproduction with high fidelity.

Japanese Laid-Open Unexamined Patent Application Publication, No. 06-125459 describes a technique for recognizing a special document such as currency, a security, and so on by comparing input image data with a previously stored specific mark using pattern matching and determining that the input image data is a special, or copy protected, document when the input image data is found to contain the previously stored specific mark. Japanese Laid-Open Unexamined Patent Application Publication, No. 2001-086330 also describes a similar technique. If an input original is determined to be a special document in this way, an unauthorized reproduction of this document can readily be prevented.

The above technique requires reference pattern data to be applied to or associated with the anti-copy protection for a specific document. However, it would be difficult to apply anti-copy protection using fixed reference pattern data to an indefinite number of copy protected or confidential documents.

As another example, Japanese Laid-Open Unexamined Patent Application Publication, No. 07-036317 describes a technique for recognizing a confidential document as a copy-prohibited document by detecting a specific mark such as "CONFIDENTIAL," for example, printed on the confidential document and indicative of its confidentiality. A print of such a specific mark indicating a document's confidentiality is a common practice used in the above-mentioned publication. When an input original is determined to be a special document in this way, unauthorized reproduction of the document can be prevented. Japanese Laid-Open Unexamined Patent Application Publication, No. 07-087309 also describes a similar method.

However, when a confidential document is marked with or includes a specific confidential mark such as "CONFIDENTIAL," for example, a copy of the confidential document can easily be made by concealing the specific confidential mark by covering the mark with a piece of paper, for example. Thus, the anti-copy protection fails to protect the confidential document from copying.

Japanese Laid-Open Unexamined Patent Application Publication, No. 09-164739 also describes a similar technique for restricting document reproduction by embedding a watermark in an original image requiring copy protection. This technique uses a paper document having a specific background image to which an original image is attached. The specific background image includes a watermark pattern having a base area and a message area. From its nature, the watermark pattern is inconspicuous in comparison with the original image and therefore it does not render the original image unreadable. This technique, however, causes the watermark pattern to appear when the original image having this watermark pattern is copied. The watermark pattern of this technique includes a warning such as "anti-copy," for example, so that a copy of this original document is recognized easily at a glance as a confidential document which is intended to be protected from copying. Therefore, this technique has a psychological effect that tends to inhibit a person from copying a confidential document.

However, this technique produces the above-mentioned psychological effect only after a copy is made. Therefore, anti-copy protection that uses a watermark of this nature does not inhibit persons who do not care about the appearance of the watermark pattern.

SUMMARY OF THE INVENTION

The present invention provides a novel image processing apparatus that performs anti-copy protection capable of handling various kinds of confidential documents.

The present invention also provides a novel image processing method which performs an anti-copy protection capable of handling various kinds of confidential documents.

The present invention also provides a novel computer program product stored on a computer readable medium for executing an image processing method of performing anti-copy protection capable of handling various kinds of confidential documents.

The present invention also provides a novel computer readable medium storing computer instructions for executing an image processing method of performing anti-copy protection capable of handling various kinds of confidential documents.

In one exemplary embodiment, a novel image processing apparatus includes a first pattern detecting mechanism, a memory, and a pattern identity determining mechanism. The first pattern detecting mechanism is configured to detect a background dot pattern embedded in a background image included in image data of an original image. The memory stores an anti-copy background dot pattern. The pattern identity determining mechanism is configured to compare the detected background dot pattern with the anti-copy background dot pattern stored in the memory and determine whether or not the detected background dot pattern is substantially identical to the anti-copy background dot pattern stored in the memory. The image data may be data obtained by reading the original image with an original reading apparatus. The original reading apparatus may be included in the image processing apparatus.

The above-mentioned image processing apparatus may further include a second pattern detecting mechanism configured to detect a background dot pattern embedded in a background image included in image data of an original image and store the detected background dot pattern as an anti-copy background dot pattern in the memory. The pattern identity determining mechanism may compare a quantitative characteristic of the detected background dot pattern with a quantitative characteristic of the anti-copy background dot pattern stored in the memory. The quantitative characteristic of the background dot pattern may include a quantitative characteristic of a base area included in the background dot pattern. The quantitative characteristic of the background dot pattern may include a quantitative characteristic of a message area included in the background dot pattern. The quantitative characteristic of the background dot pattern may include a quantitative characteristic of a base area and a message area both included in the background dot pattern. The pattern identity determining mechanism may determine that the detected background dot pattern is substantially identical to the anti-copy background dot pattern when a difference between the amounts of the detected background dot pattern and the anti-copy background dot pattern is smaller than a predetermined threshold value.

The image processing apparatus may further include an output prevention mechanism that prevents the image data from being output when the detected background dot pattern is determined to be substantially identical to the anti-copy background dot pattern by the pattern identity determining mechanism.

The image processing apparatus may also include an output protection mechanism that protects the image data from being printed when the detected background dot pattern is determined to be identical to the anti-copy background dot pattern by the pattern identity determining mechanism. Further, in one embodiment, a novel image processing method includes a storing anti-copy background dot pattern; providing image date of an original image; detecting background dot pattern embedded in a background image included in the image data of the original image; comparing the detected background dot pattern with the stored anti-copy background dot pattern; and determining whether the detected background dot pattern is substantially identical to the anti-copy background dot pattern stored in the first storing step.

The image data may be data obtained by a reading of the original image with an original reading apparatus.

The original reading apparatus may be a scanner included in an image processing apparatus.

Further, the above-mentioned image processing method may further include detecting a background dot pattern embedded in a background image included in image data of an original image and storing the detected background dot pattern as an anti-copy background dot pattern.

The determining step may compare a quantitative characteristic of the detected background dot pattern with a quantitative characteristic of the anti-copy background dot pattern. The quantitative characteristic of the background dot pattern may include a quantitative characteristic of a base area included in the background dot pattern. The quantitative characteristic of the background dot pattern may include a quantitative characteristic of a message area included in the background dot pattern. The quantitative characteristic of the background dot pattern may include a quantitative characteristics of a base area and a message area, both included in the background dot pattern.

The determining step may determine that the detected background dot pattern is substantially identical to the anti-copy background dot pattern when a difference between quantities of the detected background dot pattern and the anti-copy background dot pattern is smaller than a predetermined threshold value.

The above-mentioned image processing method may further include a step of preventing the image data from being output when the detected background dot pattern is determined as substantially identical to the anti-copy background dot pattern by the determining step.

The above-mentioned image processing method may further include a step of preventing the image data from being printed when the detected background dot pattern is determined to be substantially identical to the anti-copy background dot pattern by the determining step.

Further, in one embodiment, a novel computer program product stored on a computer readable storage medium run on an image processing apparatus executes an image processing method as described above.

Further, in one embodiment, a novel computer readable medium storing computer instructions for performing an image processing method as described above.

BRIEF DESCRIPTION OF THE DRAWINGS

A more complete appreciation of the disclosure and many attendant advantages thereof will be readily understood by reference to the following detailed description and the accompanying drawings, wherein:

FIG. 3 is an illustration showing another exemplary reproduction of the FIG. 1 contract document in which a watermark pattern is formed as a background dot pattern and embedded in the original image of the contract document;

FIG. 8 is a schematic block diagram of an image processing apparatus according to another exemplary embodiment of the present invention;

DETAILED DESCRIPTION OF INVENTION

Figure 1:
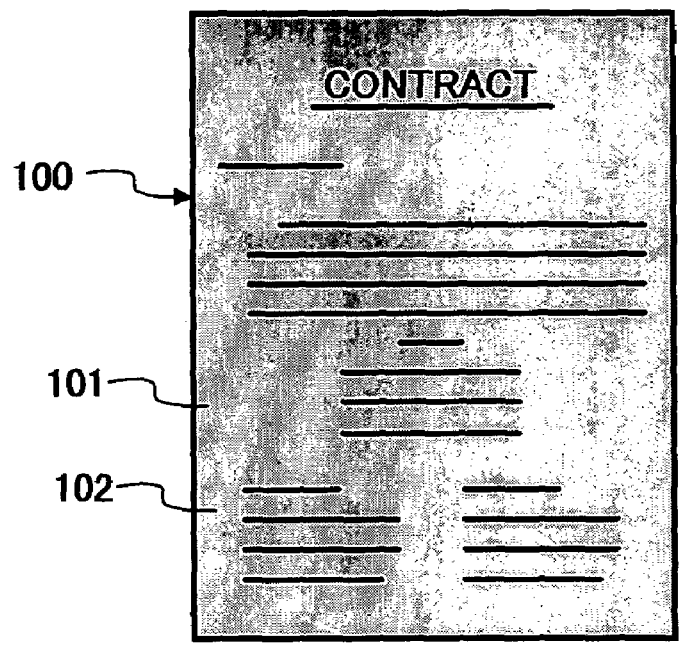
FIG. 1 is an illustration showing an exemplary original image of a contract document.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1-5, a description is provided for anti-copy watermarks processed by several image forming apparatuses (discussed below) according to exemplary embodiments of the present invention.

Figure 2:
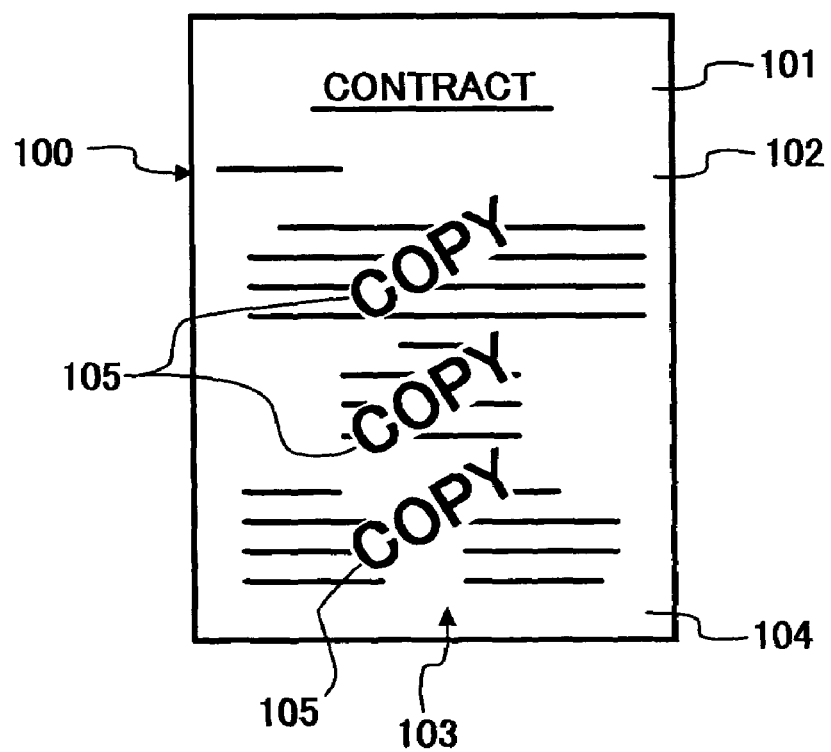
FIG. 2 is an illustration showing one exemplary reproduction of the FIG. 1 contract document in which a watermark pattern is formed as a background dot pattern and embedded in the original image of the contract document.

FIG. 1 shows a contract document 100 as an example of an anti-copy original document. The contract document 100 includes an original image 101 indicating a specific contract and an original sheet 102 on which the original image 101 is printed. FIG. 2 shows one example of a copy of the contract document 100. In this copy of FIG. 2, a watermark pattern 103 is embedded as a background dot pattern in the surface of the original sheet 102 and is formed as a plurality of words "COPY" together with the original image 101. The watermark pattern 103 includes a base area 104 and a plurality of message areas 105. FIG. 3 shows another example of a copy of the contract document 100. Alternatively, the watermark pattern 103 can be added to the surface of the original sheet 102 when the original image 101 is formed thereon, instead of being previously embedded in the surface of the original sheet 102.

In the watermark pattern 103, the base area 104 represents a background area which is a major portion of the watermark pattern 103. The message areas 105 are the areas distributed within the base area 104 for expressing messages such as a word "COPY," for example. Of course, any other words, phrases, letters, symbols, etc. can be expressed in the message areas 105. The base area 104 and the message areas 105 are not respectively defined based on basic structural differences with respect to each other but rather they are defined based on value based choices regarding visual considerations.

When a copy is made from the contract document 100 having the original image 101 printed on the original sheet 102, a part of the watermark pattern 103, that is, either the base area 104 or the message areas 105, appear together with the original image 101. In one case, as illustrated in FIG. 2, the images in the message areas 105 show up and, as a result, the words "COPY" appear in a solid character form. In another case, as illustrated in FIG. 3, the base area 104 shows up and, as a result, the words "COPY" appear in an outline character form.

In other words, one of the images in the base area 104 and the message areas 105 is made resistant to copying, and the other one of the images in the base area 104 and the message areas 105 is made susceptible to copying. Referring to FIG. 2, the image in the base area 104 of the watermark pattern 103 is made resistant to copying and the images in the message areas 105 are made susceptible to copying, so that the image of the message areas 105 appears (i.e., the letters "COPY" appear) in solid form. On the other hand, the FIG. 3 copy shows that the image in the base area 104 is made susceptible to copying and the images in the message areas 105 are made resistant to copying such that the image of the base area 104 appears (i.e., the letters "COPY" appears in the copy) in outline character form.

Figure 4A:
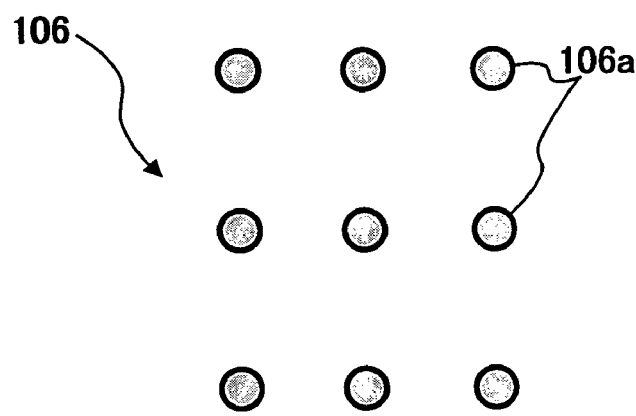
FIG. 4A is an enlarged illustration of the watermark of FIG. 3 with an exemplary watermark pattern.
Figure 4B:
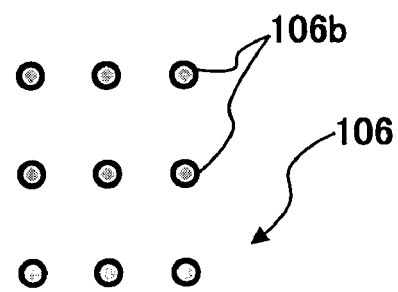
FIG. 4B is an enlarged illustration of the watermark of FIG. 3 with another exemplary watermark pattern.
Figure 5A:
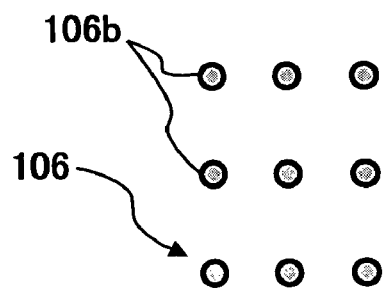
FIG. 5A is an enlarged illustration of the watermark of FIG. 2 with another exemplary watermark pattern.
Figure 5B:
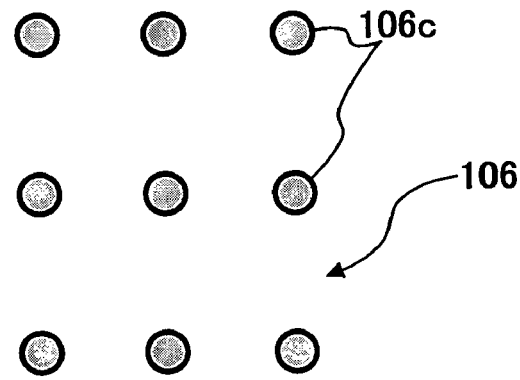
FIG. 5B is an enlarged illustration of the watermark of FIG. 2 with another exemplary watermark pattern.

FIGS. 4A and 4B illustrate an enlarged portion of the watermark pattern 103 of FIG. 3, and FIGS. 5A and 5B illustrate an enlarged portion of the watermark pattern of 103 FIG. 2. As illustrated in FIGS. 4A, 4B, 5A and 5B, the above-described watermark pattern 103 is made of an aggregation of dots 106 which are separated into two dot groups; one group includes dots 106a having a large dot size and the other group includes dots 106b having a small dot size, as illustrated in FIGS. 4A, 4B, 5A and 5B. That is, the dots 106a have a sufficiently large size to be susceptible to copying and the dots 106b have an sufficiently small size to be resistant to copying. In other words, in the watermark pattern 103 of FIG. 2, the image in the base area 104 is made of the small-sized dots 106b and the images in the message areas 105 are made of the large-sized dots 106c, as illustrated in FIG. 5A and FIG. 5B. Consequently images in the message areas 105 show up and the letters "COPY" shows up in solid character form.

On the other hand, in the watermark pattern 103 of FIG. 3, the image in the base area 104 is made of the large-sized dots 106a and the images in the message areas 105 are made of the small-sized dots 106b, as illustrated in FIGS. 4A and 4B. Consequently, images in the base area 104 appear and the letters "COPY" appear in outline character form.

As an alternative to the dots 106, it is possible to use other patterns such as, for example, a thin line pattern, a specific design pattern, and so forth to form the images in the base area 104 and the message areas 105 of the watermark pattern 103.

The present exemplary embodiment deals with one of the base area 104 and the message areas 105 in quantitative characteristic. For example, when the image showing up is formed of dots (i.e., 106), as described above, it is expressed by a characteristic such as a size, a density (i.e., a number of dots per unit area), or the like. When the image showing up is formed of thin lines, it is expressed by a characteristic such as width of the lines, for example. When the image showing up is formed of specific patterns, it can be expressed by a characteristic of the specific pattern, for example.

As an alternative, it is possible to deal with one of the images in the base area 104 and the message areas 105, which is not shown up, as data expressed in quantitative characteristic. It is further possible to deal with both of the images in the base area 104 and the message areas 105, which appear and do not appear upon copying, as data expressed in the respective characteristic quantities. In other words, when at least one of the images in the base area 104 and the message areas 105, which are either embedded in the original sheet 102 or formed during the time the original image 101 is formed, is computer-readable data, these images can be handled as data expressed in the respective characteristic quantities when the original image 101 printed on the original sheet 102 is read.

As described above, it is also possible to use a background dot pattern different from the watermark pattern 103 of, for example, FIG. 2. For example, the pattern of the base area 104 or the message areas 105 in the watermark pattern 103 can be used as an alternative background dot pattern. In this case, when the pattern of the base area 104 or the message areas 105, which is either embedded in the original sheet 102 or formed during the time an original image including the pattern is formed, is computer-readable data, the pattern can also be handled as data expressed in the corresponding characteristic quantity when the original image printed on the original sheet 102 is read.

An exemplary image processing method according to an embodiment of the present invention is now explained. The image processing method uses hardware resources including digital circuits, a computer, and so forth in order to perform a step of detecting, from image data, at least one of the images in the base area 104 and the message areas 105 included in the watermark pattern 103, embedded in a background image included in the image data according to the original image 101. This detecting step detects the characteristics of the above-described watermark pattern 103, that is, the dot size, the dot density, the line width, the design pattern, and so forth, for example. After this detecting step, the image processing method performs a step of comparing the detected watermark pattern 103 with a reference watermark pattern prepared as a background anti-copy dot pattern which is stored in a memory area (not shown) and determining whether the detected watermark pattern 103 is substantially identical to the reference watermark pattern, using the hardware resources. This step is referred to as an identity determination step.

More specifically, the identity determination step determines whether a difference between the characteristic quantities (e.g., the dot density) of the detected watermark pattern 103 and the reference watermark pattern is smaller than a predetermined threshold value. That is, when the difference is determined as smaller than the predetermined threshold value, the identity determination step determines that the detected watermark pattern 103 is substantially identical to the reference watermark pattern.

Therefore, by previously storing the above-described reference watermark pattern as the anti-copy background dot pattern in the memory, the present embodiment can check whether the detected watermark pattern 103 is identical to such reference watermark pattern so as to determine whether to restrict an output of the image data according to the original image 101, regardless of what contents the original image 101 has.

Figure 6:
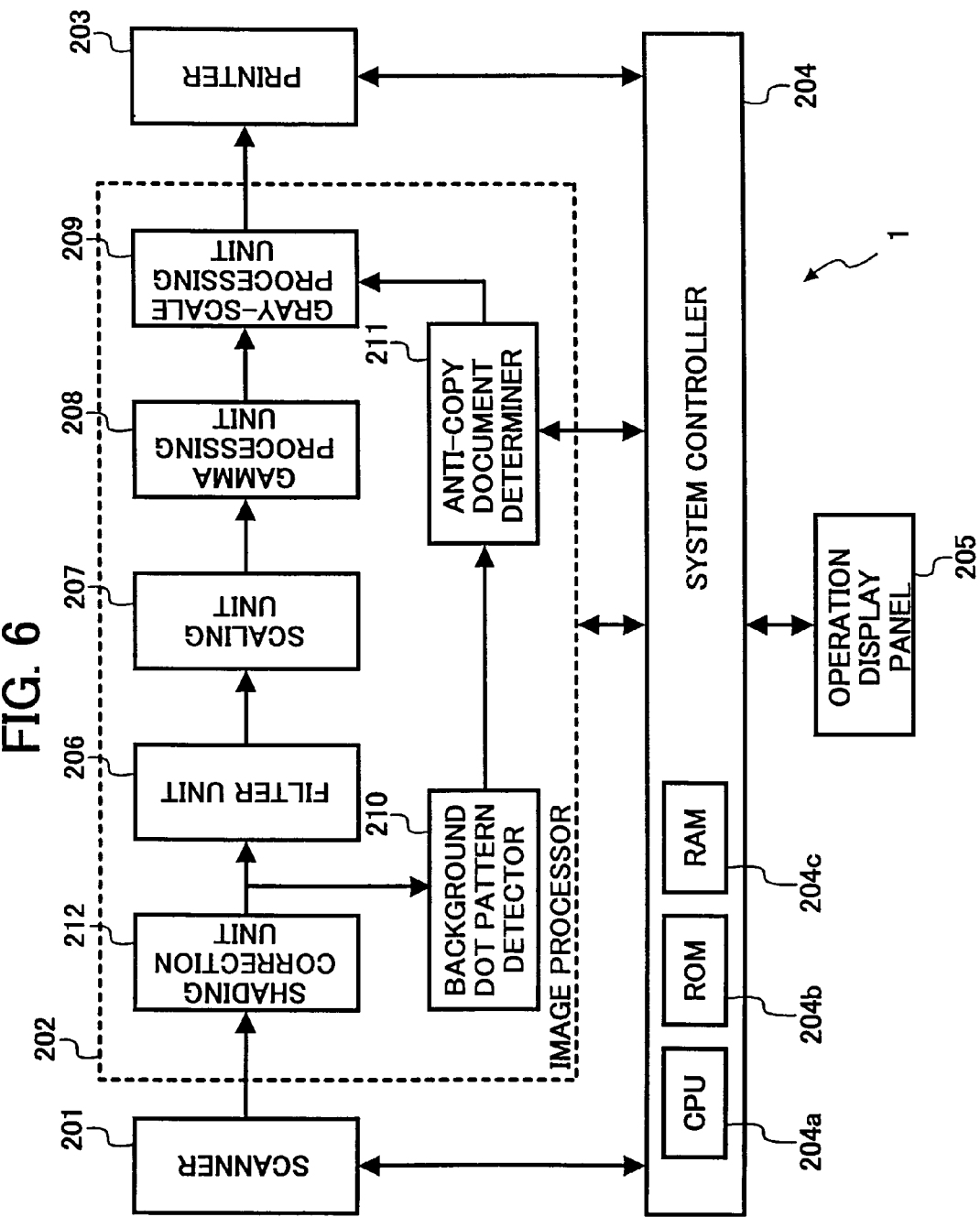
FIG. 6 is a schematic block diagram of an image processing apparatus according to one exemplary embodiment of the present invention.

Referring to FIG. 6, an exemplary structure of the image processing apparatus 1 according to an exemplary embodiment of the present invention is explained. As shown in FIG. 6, the image processing apparatus 1 is a digital copying machine including a scanner 201, an image processor 202, a printer 203, a system controller 204, and an operation display panel 205. The system controller 204 includes a CPU (central processing unit) 204a, a ROM (read only memory) 204b, and a RAM (random access memory) 204c. By using computing functions achieved with these components, the system controller 204 controls the operations of the scanner 201, the image processor 202, and the printer 203 in accordance with instructions input through the operation display panel 205 and displays necessary information on the operation display panel 205.

The image processor 202 includes a shading correction unit 212, a filter unit 206, a scaling unit 207, a gamma processing unit 208, a gray-scale processing unit 209, a background dot pattern detector 210, and an anti-copy document determiner 211. Amongst these components, the shading correction unit 212, the filter unit 206, the scaling unit 207, the gamma processing unit 208, and the gray-scale processing unit 209 are similar to those generally used in an ordinary digital copying machine and therefore an explanation for these components is omitted.

The background dot pattern detector 210 and the anti-copy document determiner 211 of the image processor 202 are hardware resources including digital circuits for detecting and determining an anti-copy document such as the contract document 100 of FIG. 1 and prohibiting duplication of such document.

Figure 7A:
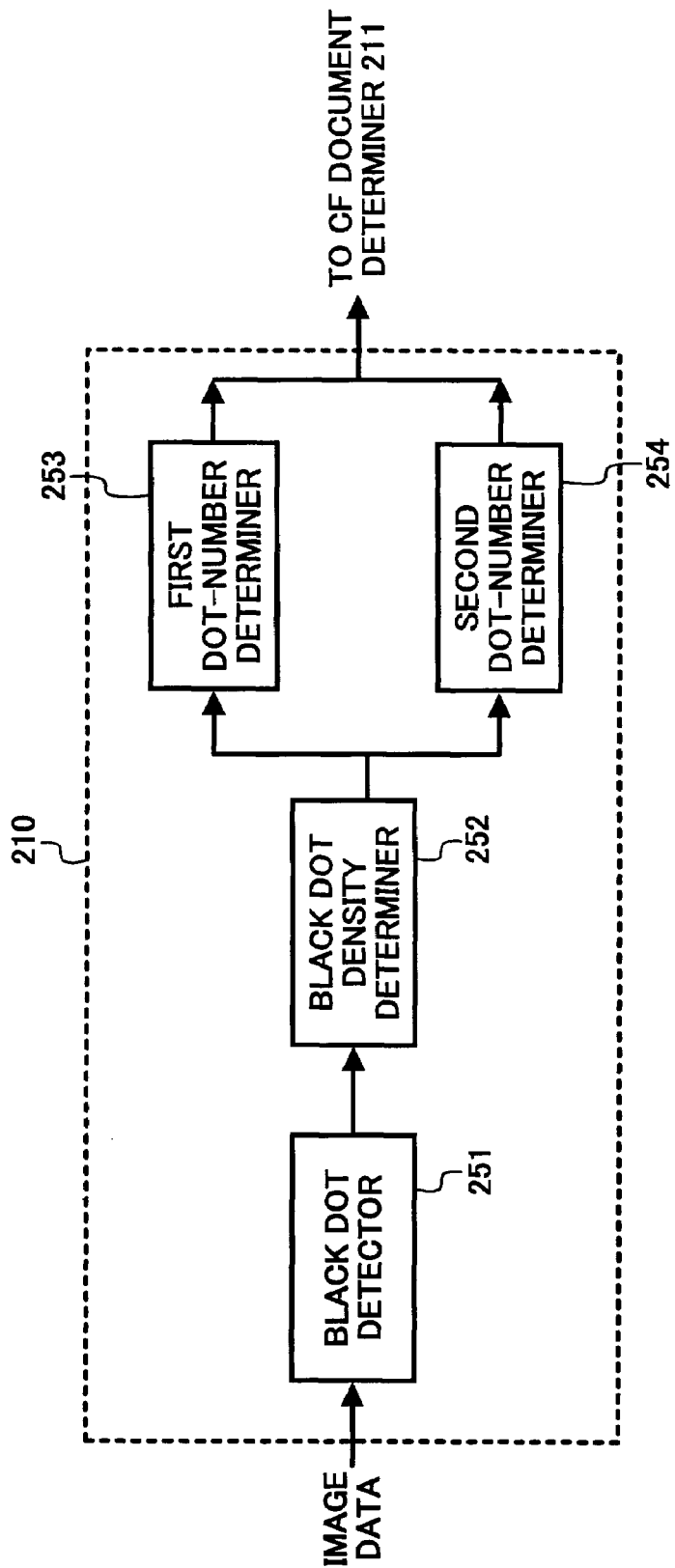
FIG. 7A-7C shows exemplary schematic block diagrams of a background dot pattern detector.

The background dot pattern detector 210 has an exemplary hardware structure as illustrated in FIG. 7A, including a black dot detector 251, a black dot density determiner 252, a first dot-number determiner 253, and a second dot-number determiner 254. The black dot detector 251 detects the dots 106 from the image data generated based on readings of the original image 101 by the scanner 201. An actual detection method is selected from among various known techniques for detecting image patterns with digital circuits, such as a pattern matching technique, for example. After detection of dots 106, the black dot density determiner 252 calculates a dot density within a specific area with respect to the dots 106 detected by the black dot detector 251. This calculation can be performed using digital counters, adders, and so on.

In the background dot pattern detector 210, both the first dot-number determiner 253 and the second dot-number determiner 254 include a memory area (not shown). The first dot-number determiner 253 stores first and second base area threshold values. The first base area threshold value is used by the first dot-number determiner 253 as a permissible value in the identity determination relative to a dot density in a specific unit area of the base area 104 in the reference watermark pattern indicating the background anti-copy dot pattern. Based on this first base area threshold value, the black dot density determiner 252 performs the dot density calculation. The second base area threshold value is used by the first dot-number determiner 253 as a permissible value in the identity determination relative to a dot number in a specific unit area of the base area 104 in the reference watermark pattern 103 indicating the anti-copy mark which is included in the original sheet 102.

The second dot-number determiner 254 stores first and second message area threshold values. The first message area threshold value is used by the second dot-number determiner 254 as a permissible value in the identity determination relative to a dot density in a specific unit area of the message area 105 in the reference watermark pattern 103 prepared as the background anti-copy dot pattern. Based on this first message area threshold value, the black dot density determiner 252 performs the dot density calculation. The second message area threshold value is used by the second dot-number determiner 254 as a permissible value in the identity determination relative to a dot number in a specific unit area of the message area 105 in the reference watermark pattern 103 indicating the anti-copy mark which is included in the original sheet 102.

The first dot-number determiner 253 accumulates in a counter (not shown) the number of dots 106 which are determined as the identical size, i.e., the dots 106a or the dots 106b, by the black dot detector 251. The first dot-number determiner 253 increments the counter during operations to determine whether the density of dots 106 calculated by the black dot density determiner 252 is smaller than the first base area threshold value stored in the memory. The first dot-number determiner 253 then determines that the base area 104 of the anti-copy watermark pattern 103 exists when the accumulated dot number is found to be smaller than the second base area threshold value stored in the memory. The first dot-number determiner 253 transmits the determination result to the anti-copy document determiner 211.

The second dot-number determiner 254 accumulates the number of dots 106 in a counter (not shown), for example, which are determined as the identical size, i.e., the dots 106*a* or the dots 106*b*, by the black dot detector 251. The second dot-number determiner 254 increments the counter during operations to determine whether the density of dots 106 calculated by the black dot density determiner 252 is smaller than the first message area threshold value stored in the memory. The second dot-number determiner 254 then determines that the message area 105 of the anti-copy watermark pattern 103 exists when the accumulated dot number is found to be smaller than the second message area threshold value stored in the memory. The second dot-number determiner 254 transmits the determination result to the anti-copy document determiner 211.

Upon receiving the determination result from the background dot pattern detector 210, the anti-copy document determiner 211 performs the determination process for determining whether the present document is an anti-copy document with reference to a predefined standard. This standard can be, for example, input as parameters through the operation display panel 205 and stored in a memory area (not shown) of the anti-copy document determiner 211. For example, the anti-copy document determiner 211 determines that the present document is an anti-copy document, e.g. a confidential document, upon determining that one of the base area 104 and the message area 105 of the watermark pattern 103 exists in the original image 101 read by the scanner 201. In another example, the anti-copy document determiner 211 determines that the present document is an anti-copy document, e.g. a confidential document, upon determining that both of the base area 104 and the message area 105 of the watermark pattern 103 exist in the original image 101 read by the scanner 201.

Figure 7B:
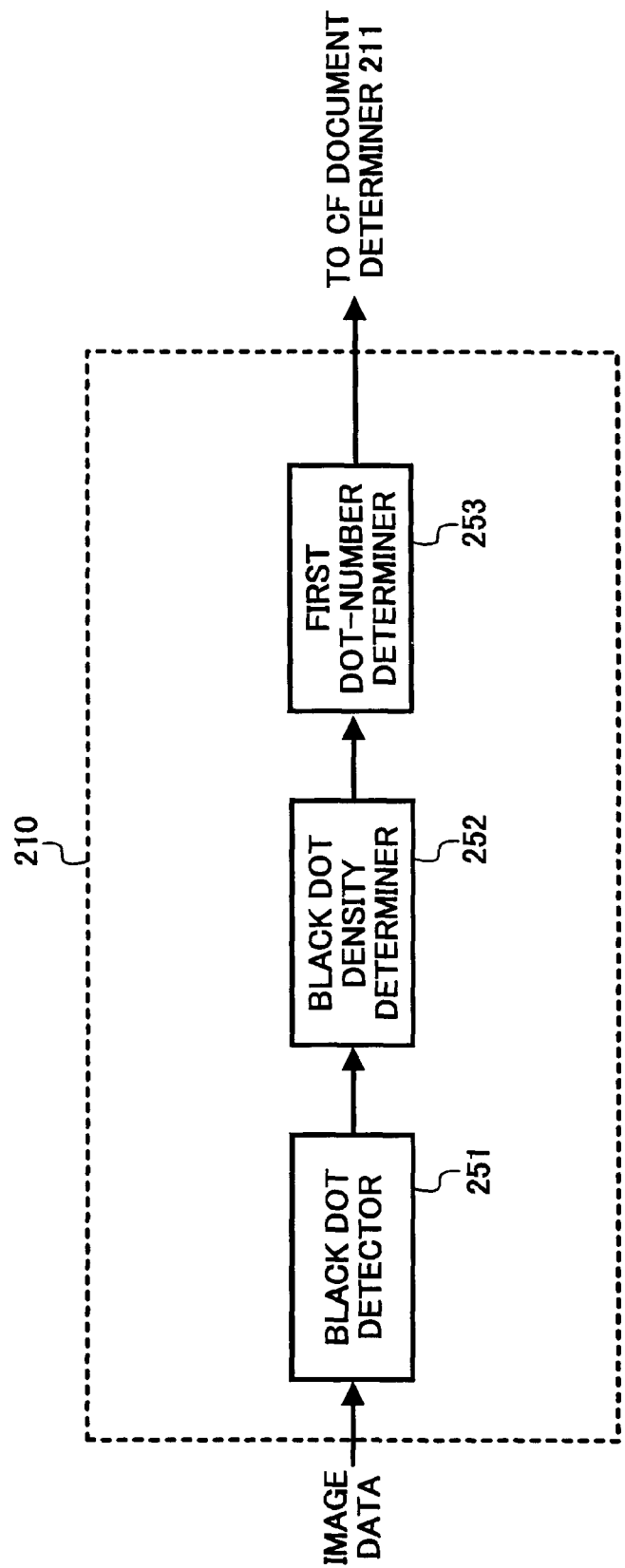
Figure 7C:
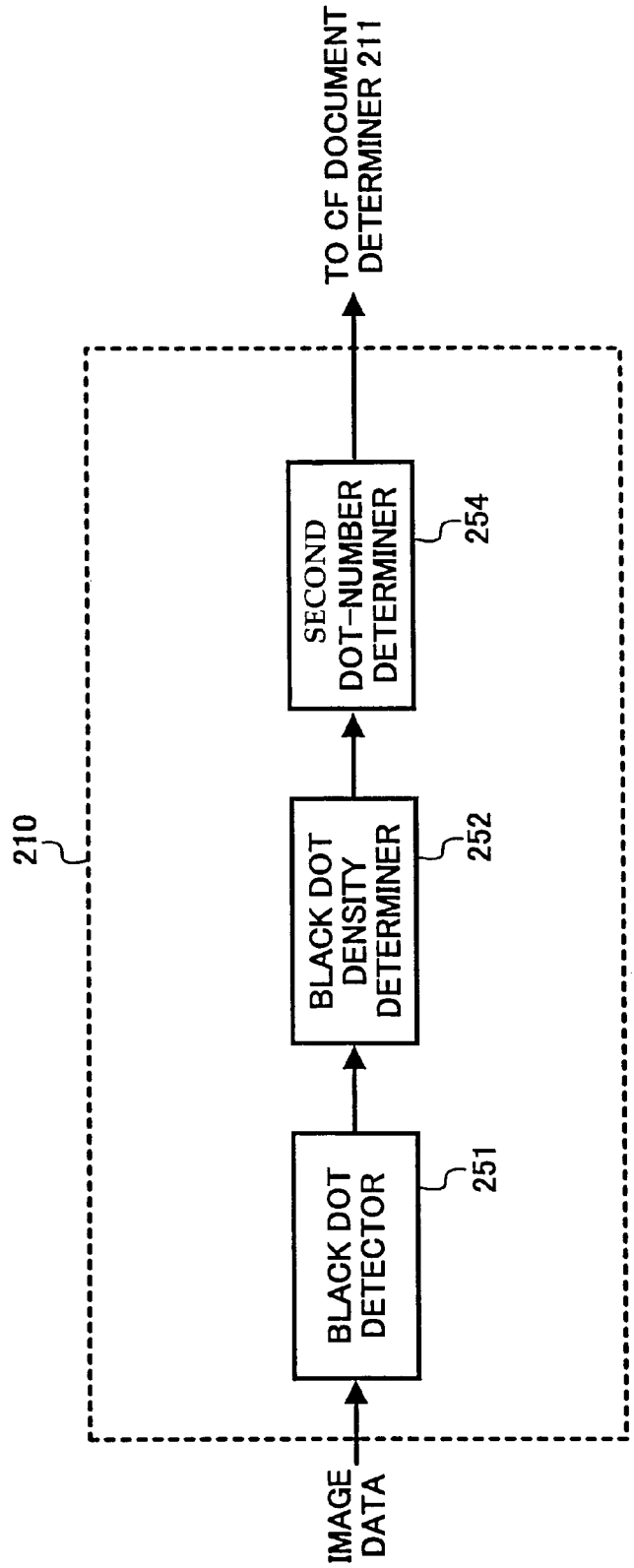

When the anti-copy document determiner 211 is set to determine that the present document is an anti-copy document when one of the base area 104 and the message area 105 of the watermark pattern 103 is determined as existing in the original image 101, it is not necessary to provide both the first dot-number determiner 253 and the second dot-number determiner 254 in the background dot pattern detector 210 as in FIG. 7A. When the base area 104 is used and the message area 105 is not used for the anti-copy document determining condition, the background dot pattern detector 210 includes the first dot-number determiner 253 but not the second dot-number determiner 254, as shown in FIG. 7B. Alternatively, when the message area 105 is used and the base area 104 is not used for the anti-copy document determining condition, the background dot pattern detector 210 will include the second dot-number determiner 254 but not the first dot-number determiner 253, as shown in FIG. 7C.

Thus, the present embodiment detects from the image data whether or not a watermark pattern 103 is embedded in the background image of the original image 101. If so, the present embodiment compares the detected watermark pattern 103 to the prestored reference anti-copy watermark pattern, thereby performing the watermark pattern identity determination. With this operation, the present embodiment can determine whether it is permissible to output the image data of the original image 101, regardless of the type of the original image.

When the anti-copy document determiner 211 determines that the original image 101 read by the scanner 201 is an anti-copy document, it transmits information indicating that an anti-copy document is detected to the system controller 204. In response to the transmitted information, the system controller 204 performs a post-anti-copy-document-detection operation for prohibiting the reproduction operation of the printer 203 with respect to the anti-copy document so determined by the system controller 204.

When the original image 101 read by the scanner 201 is determined as not an anti-copy document, the image processing apparatus 1 performs an ordinary reproduction operation. More specifically, the image data of the original image 101 read by the scanner 201 is processed through the image processor 202 and the resultant image data are reproduced into an image by the printer 203.

Next, an exemplary structure of an image processing apparatus 2 according to another preferred embodiment of the present invention is explained with reference to FIG. 8. As shown in FIG. 8, the image processing apparatus 2 is a digital copying machine including a scanner 901, an image processor 902, a printer 903, a system controller 904, and an operation display panel 905. The system controller 904 includes a CPU (central processing unit) 904*a*, a ROM (read only memory) 904*b*, and a RAM (random access memory) 904*c*. By using computing functions achieved with these components, the system controller 904 controls the operations of the scanner 901, the image processor 902, and the printer 903 in accordance with the instructions input through the operation display panel 905 and displays information on the operation display panel 905.

The image processor 902 includes a shading correction unit 912, a filter unit 906, a scaling unit 907, a gamma processing unit 908, a gray-scale processing unit 909, a background dot pattern detector 910, an anti-copy document determiner 911, an image signal scrambler 913, and a selector 914. Amongst these components, the shading correction unit 912, the filter unit 906, the scaling unit 907, the gamma processing unit 908, and the gray-scale processing unit 909 are similar to those generally used in an ordinary digital copying machine and therefore an explanation for these components is omitted.

The background dot pattern detector 910, the anti-copy document determiner 911, the image signal scrambler 913, and the selector 914 of the image processor 902 are hardware resources including digital circuits for detecting and determining an anti-copy document such as the contract document 100 of FIG. 1 and prohibiting duplication of such document. In this case, the image processing apparatus 2 scrambles an image signal of the read anti-copy document so that the read anti-copy document is reproduced into an unreadable copy.

The background pattern detector 910 has an exemplary hardware structure which is similar to the background dot pattern detector 910 of FIG. 7A, which includes the black dot detector 251, the black dot density determiner 252, the first dot-number determiner 253, and the second dot-number determiner 254. That is, in the background pattern detector 910, the black dot detector 251 detects the dots 106 from the image data generated based on the readings of the original image 101 by the scanner 901. As described above, an actual method of the detection is selected from among various known techniques for detecting image patterns with digital circuits, such as a pattern matching technique, for example. After detection of dots 106, the black dot density determiner 252 calculates a dot density within a specific area with respect to the dots 106 detected by the black dot detector 251. This calculation can be performed using digital counters, adders, and so on.

In the background pattern detector 910, each of the first dot-number determiner 253 and the second dot-number determiner 254 includes a memory area (not shown). The first dot-number determiner 253 stores a first and second base area threshold values for use as a permissible value in the identity determination relative to a dot density in a specific unit area of the base area 104 in the reference watermark pattern 103 indicating as the background anti-copy dot pattern. The first dot-number determiner 253 also stores a second base area threshold value to be used as a permissible value in the identity determination relative to a dot number in a specific unit area of the base area 104 in the reference watermark pattern 103 indicating the anti-copy mark which is included in the original sheet 102. Based on these first and second base area threshold values, the black dot density determiner 252 performs the dot density calculation.

The second dot-number determiner 254 stores a first message area threshold value to be used as a permissible value in the identity determination relative to a dot density in a specific unit area of the message area 105 in the reference watermark pattern 103 indicating the background anti-copy dot pattern. The second dot-number determiner 254 also stores a second message area threshold value for use as a permissible value in the identity determination relative to a dot number in a specific unit area of the message area 105 in the reference watermark pattern 103 indicating the anti-copy mark that is included in original sheet 102. Based on these first and second message area threshold values, the black dot density determiner 252 performs the dot density calculation.

The first dot-number determiner 253 accumulates the number of dots 106 in a counter (not shown), for example, which are determined as the identical size, i.e., the dots 106a or the dots 106b, by the black dot detector 251. The first dot-number determiner 253 increments the counter during operations to determine whether the density of dots 106 calculated by the black dot density determiner 252 is smaller than the first base area threshold value stored in the memory. The first dot-number determiner 253 then determines that the base area 104 of the anti-copy watermark pattern 103 exists when the accumulated dot number is found to be smaller than the second base area threshold value stored in the memory. The first dot-number determiner 253 transmits the determination result to the anti-copy document determiner 911.

The second dot-number determiner 254 accumulates the number of dots 106 in a counter (not shown), for example, which is determined as the identical size, i.e., the dots 106a or the dots 106b, by the black dot detector 251. The second dot-number determiner 254 increments the counter during operations to determine whether the density of dots 106 calculated by the black dot density determiner 252 is smaller than the first message area threshold value stored in the memory. The second dot-number determiner 254 then determines that the message area 105 of the anti-copy watermark pattern 103 exists when the accumulated dot number is found to be smaller than the second message area threshold value stored in the memory. The second dot-number determiner 254 transmits the determination result to the anti-copy document determiner 911.

Upon receiving the determination result from the background dot pattern detector 910, the anti-copy document determiner 911 performs the determination process for determining whether the present document is an anti-copy document with reference to a predefined standard. This standard can be, for example, input as parameters through the operation display panel 905 and stored in a memory area (not shown) of the anti-copy document determiner 911. For example, the anti-copy document determiner 911 determines that the present document is an anti-copy document like a confidential document upon determining that one of the base area 104 and the message area 105 of the watermark pattern 103 exists in the original image 101 read by the scanner 901. For another example, the anti-copy document determiner 911 determines that the present document is an anti-copy document upon determining that both of the base area 104 and the message area 105 of the watermark pattern 103 exist in the original image 101 read by the scanner 901.

When the anti-copy document determiner 911 is set to determine that the present document is an anti-copy document when one of the base area 104 and the message area 105 of the watermark pattern 103 is present in original image 101, it is unnecessary to provide both the first dot-number determiner 253 and the second dot-number determiner 254 in the background dot pattern detector 910. When base area 104 is used and message area 105 is not used for the anti-copy document determining condition, the background dot pattern detector 910 will include the first dot-number determiner 253 but not the second dot-number determiner 254, as shown in FIG. 7B. As an alternative, when the message area 105 is used and the base area 104 is not used for the anti-copy document determining condition, the background dot pattern detector 910 includes the second dot-number determiner 254 but not the first dot-number determiner 253, as shown in FIG. 7C.

Thus, the present embodiment detects from the image data the watermark pattern 103 embedded in the background image which is included in the image data of the original image 101. Then, the present embodiment compares the detected watermark pattern 103 against the prestored reference anti-copy watermark pattern, thereby performing the watermark pattern identity determination. With this operation, the present embodiment can determine whether it is permissible to output the image data of the original image 101, regardless of the types of the original image.

In parallel to the anti-copy document determination performed by the background dot pattern detector 910 and the anti-copy document determiner 911, the image signal scrambler 913 receives the image signal from the shading correction unit 912. The image signal sent from the shading correction unit 912 is an image signal read by the scanner 901 and is shaded by the shading correction unit 912. Upon receiving the shaded image signal, the image signal scrambler 913 scrambles this shaded image signal so that a reproduced output of the present anti-copy document from the printer 903 is an unreadable image.

When the anti-copy document determiner 911 determines that the original image 101 read by the scanner 901 is an anti-copy document, it transmits an anti-copy signal indicating that an anti-copy document has been detected to the selector 914 of the image processor 902. The selector 914 usually selects the image signal from the shading correction unit 912. However, upon receiving the anti-copy signal, the selector 914 selects the image signal output from the image signal scrambler 913 instead of selecting the image signal from the shading correction unit 912. As a result, the selector 914 outputs the scrambled image signal to the subsequent image processing circuits. Accordingly, when the original image 101 read by the scanner 901 is an anti-copy document, reproduction is prevented and a scrambled image is output.

The image signal scrambling by the image signal scrambler 913 may, for example, change values of pixels included in the image signal to a predetermined pixel value so that the image is filled in with a specific color (e.g., a white, gray, or black color) determined by the predetermined pixel value. As an alternative, the image signal scrambler 913 may add a repetitive pattern signal to the image signal to make the image signal scrambled.

Next, an exemplary structure of an image processing apparatus 3 according to another preferred embodiment of the present invention is explained with reference to FIGS. 9 and 10. As described above, the image processing apparatuses 1 and 2 of FIGS. 6 and 8 perform exemplary copy protection operations which use hardware resources to detect an anti-copy document and perform copy protection processing based on the detection result. The image processing apparatus 3 includes an implementation of software resources for performing copy protection functions after detecting an anti-copy document, which is further explained below.

Figure 9:
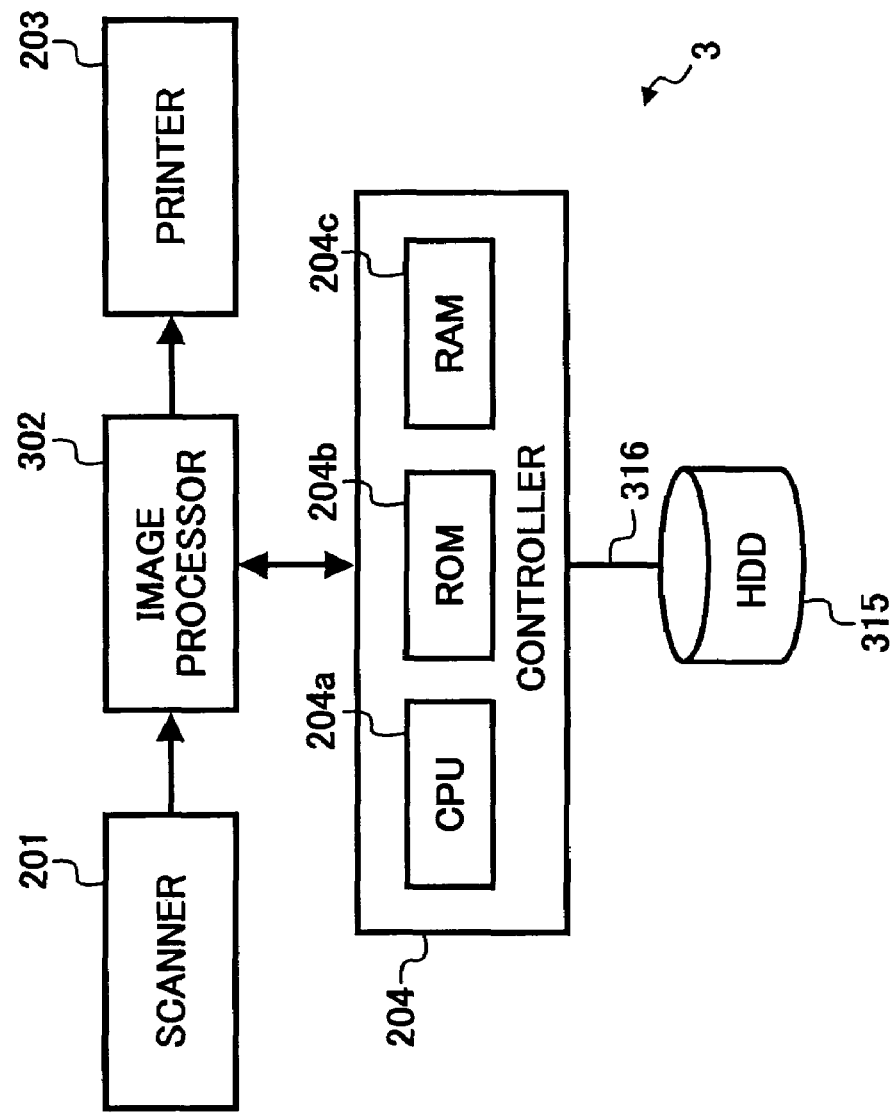
FIG. 9 is a schematic block diagram of an image processing apparatus according to another exemplary embodiment of the present invention.

As shown in FIG. 9, the image processing apparatus 3 includes the scanner 201, an image processor 302, the printer 203, the system controller 204, a hard disc drive (HDD) 315, and a bus 316. Amongst these components, the scanner 201, the printer 203, and the system controller 204 are equivalent to those shown in FIG. 6. Unlike the image processor 202 of FIG. 6, the image processor 302 of FIG. 9 does not include the background dot pattern detector 210 and the anti-copy document detector 211. In addition, a computer program for performing copy protection functions is installed as firmware in the ROM 204b of the system controller 204. As an alternative, the computer program for performing copy protection functions may be installed in the hard disc drive 315 connected to a micro computer configured by the CPU 204a, the ROM 204b, and the RAM 204c through the bus 316. In this case, the computer program can be loaded to the RAM 204c and is activated when the image processing apparatus 3 is powered. Accordingly, in the image processing apparatus 3, the system controller 204 is a main unit to control the copy protection operation according to the copy protection program prestored in either the ROM 204b or the hard disc drive 315.

Figure 10A:
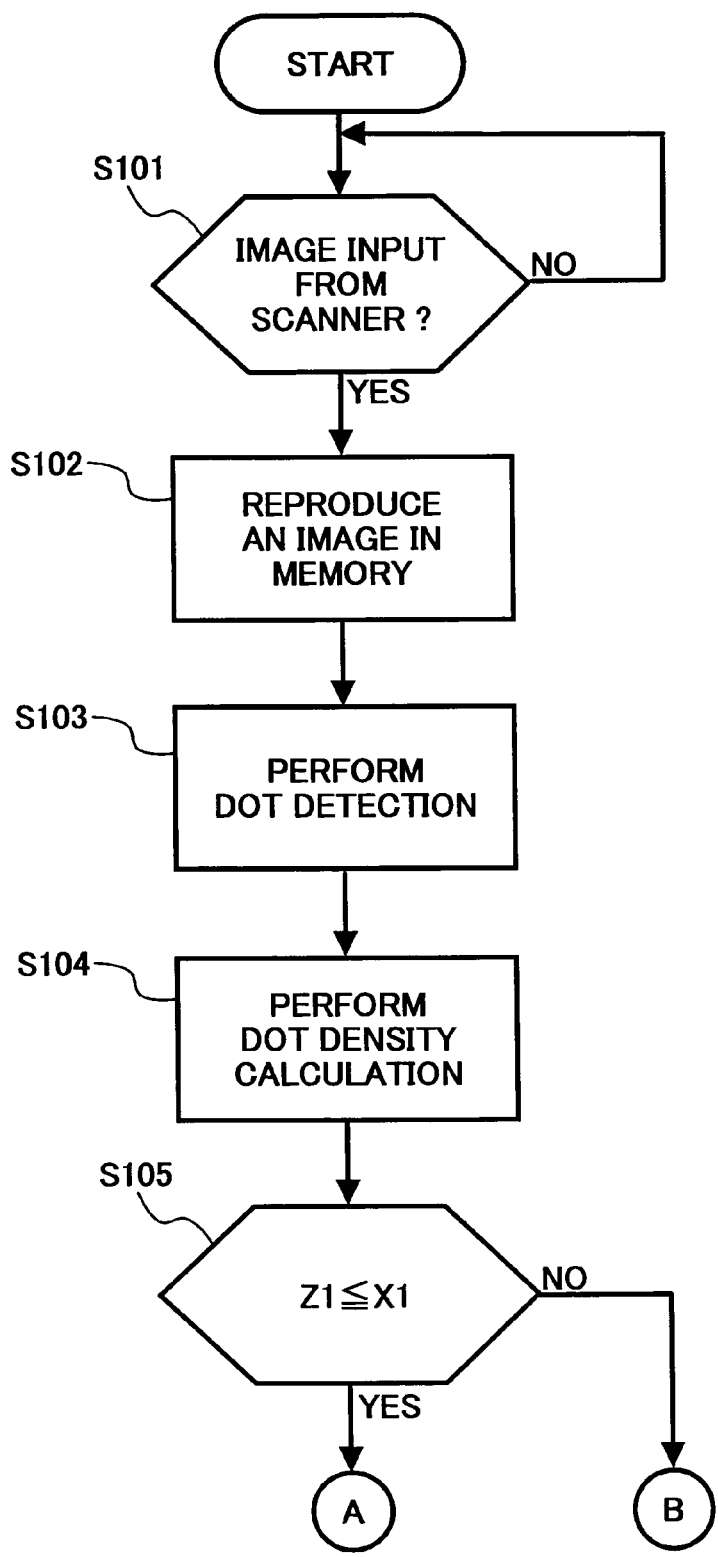
FIG. 10 (divided into FIGS. 10A and 10B) is a flowchart of an exemplary procedure for performing an anti-copy protection operation using the image processing apparatus of FIG. 9.
Figure 10B:
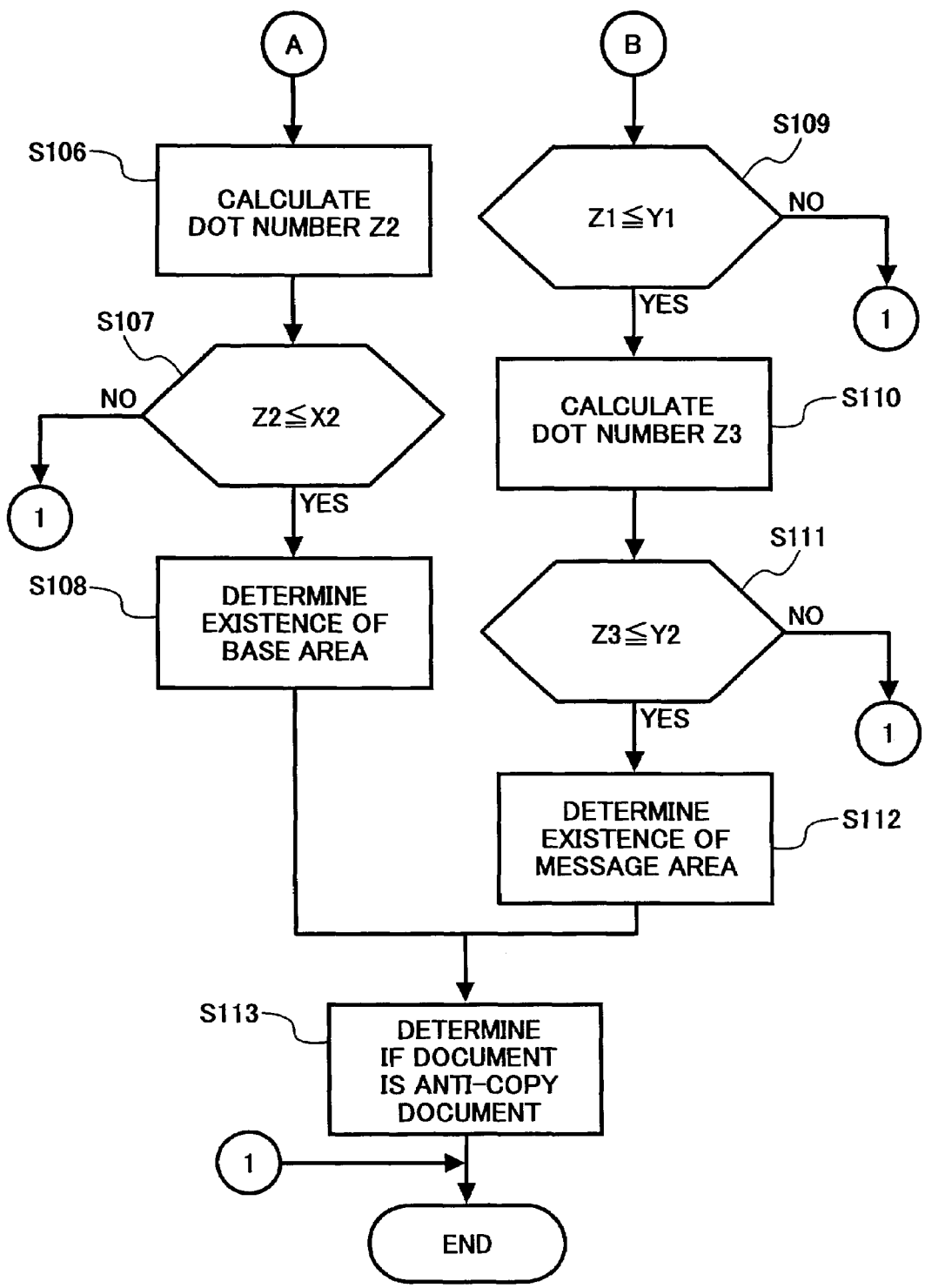

Referring to FIG. 10, an exemplary procedure of the copy protection operation performed by the image processing apparatus 3 is explained. In step S101 of FIG. 10, the CPU 204a of the system controller 204 repeatedly checks whether image data read from the original image 101 by the scanner 201 is input to the image processor 302. This check operation is performed at predetermined time intervals. When the CPU 204a determines that image data is input and the check result of step S101 becomes YES, the CPU 204a stores the input image data into a memory area of the RAM 204c for storing image data, in step S102. Then, in step S103, the CPU 204a detects the dots 106 from the image data stored in the RAM 204c. An actual detection method may be one of various conventional methods for detecting images such as a pattern matching method. Then, in step S104, the CPU 204a calculates a dot density Z1 in a specific unit area of the detected dots 106.

In this embodiment, the RAM 204c includes at least one of a nonvolatile memory and a battery-backed-up memory to store data including a first base area threshold value X1, a second base area threshold value X2, a first message area threshold value Y1 and a second message area threshold value Y2. The first base area threshold value X1 is a permissible value used in an identity determination relative to a dot density in a specific unit area of the base area 104 in the reference watermark pattern 103 prepared as the background anti-copy dot pattern. The second base area threshold value X2 a permissible value used in an identity determination relative to a dot number in a specific unit area of the base area 104 in the reference watermark pattern 103 indicating the anti-copy mark included in the original sheet 102. The first message area threshold value Y1 is a permissible value used in the identity determination relative to a dot density in a specific unit area of the message area 105 in the reference watermark pattern 103 prepared as the background anti-copy dot pattern. The second message area threshold value Y2 is a permissible value used in the identity determination relative to a dot number in a specific unit area of the message area 105 in the reference watermark pattern 103 indicating the anti-copy mark which is included in the original sheet 102.

In step S105, the CPU 204a determines whether the dot density Z1 in a specific unit area of the dots 106 detected in step S104 is smaller than or equal to the first base area threshold value X1, stored in the RAM 204c, where X1 is greater than the dot density of the base area 104 included in the watermark pattern 103. The CPU 204a executes step S109 when the CPU 204a determines that the dot density in a specific unit area of the dots 106 detected in step S104 is not smaller than or equal to the first base area threshold value X1 and the determination result of step S105 becomes NO. In step S109, the CPU 204a determines whether the dot density Z1 in a specific unit area of the dots 106 detected in step S104 is smaller than or equal to the first message area threshold value Y1, stored in the RAM 204c, where Y1 is greater than the dot density of the message area 105 included in the watermark pattern 103.

When the CPU 204a determines that the dot density Z1 in a specific unit area of the dots 106 detected in step S104 is smaller than or equal to the first base area threshold value X1 and the determination result of step S105 becomes YES, the CPU 204a performs a dot number calculation to accumulate the number of the detected dots 106, in step S106. As a result of the accumulation, an accumulated dot number Z2 is generated and is stored in a registration memory area of the RAM 204c, for example. Then, in step S107, the CPU 204a determines whether the accumulated dot number Z2 is smaller than or equal to the second base area threshold value X2, stored in the RAM 204c, where X2 is greater than the dot number in the base area 104 of the watermark pattern 103. When the accumulated dot number Z2 is determined as smaller than or equal to the second base area threshold value X2 and the determination result of step S107 is YES, the CPU 204a determines that the base area 104 of the anti-copy watermark pattern 103 exists, in step S108. After that, the CPU 204a transmits data indicating this determination result to an anti-copy document determination procedure, in step S113.

When the accumulated dot number Z2 is determined as not smaller than or equal to the second base area threshold value X2 and the determination result of step S107 is NO, the CPU 204a determines that the base area 104 of the anti-copy watermark pattern 103 does not exist and processing terminates.

In step S109, when the dot density Z1 in a specific unit area of the dots 106 detected in step S104 is smaller than or equal to the first message area threshold value Y1 and the determination result thereof is YES, the CPU 204a executes step S110. In step S110, the CPU 204a performs a dot number calculation to accumulate the number of the detected dots 106. As a result of the accumulation, an accumulated dot number Z3 is generated and is stored in a registration memory area of the RAM 204c, for example. Then, in step S111, the CPU 204a determines whether the accumulated dot number Z3 is smaller than or equal to the second message area threshold value Y2, stored in the RAM 204c, where Y2 is greater than the dot number in the message area 105 of the watermark pattern 103. When the accumulated dot number Z3 is determined as smaller than or equal to the second message area threshold value Y2 and the determination result of step S111 becomes YES, the CPU 204a judges that the message area 105 of the anti-copy watermark pattern 103 exists, in step S112. After that, the CPU 204a transmits data indicating this determination result to an anti-copy document determination procedure, in step S113.

The CPU 204a will end processing in either case when the dot density Z1 in a specific unit area of the dots 106 detected in step S104 is not smaller than or equal to the first message area threshold value Y1 and the determination result thereof becomes NO, or when the accumulated dot number Z3 is determined as not smaller than or equal to the second message area threshold value Y2 and the determination result of step S111 becomes NO.

In step S113, the CPU 204a executes anti-document determination processing with reference to a predetermined standard. This standard can be, for example, established by being input as parameters through the operation panel 205 and is stored in a nonvolatile memory and a battery-backed-up memory included in the RAM 204c. With the thus-prepared exemplary standard, the anti-copy document determination process of the CPU 204a in step S113 determines that the present document is an anti-copy document when determining that one of the base area 104 and the message area 105 of the watermark pattern 103 exists in the original image 101 read by the scanner 201. In another example, the anti-copy document determining processing by the CPU 204a determines that the present document is an anti-copy document when determining that both of the base area 104 and the message area 105 of the watermark pattern 103 exist in the original image 101 read by the scanner 201.

Thus, the present embodiment detects from the image data the watermark pattern 103 embedded in the background image which is included in the image data of the original image 101. Then, the present embodiment compares the detected watermark pattern 103 to the prestored reference anti-copy watermark pattern, thereby performing the watermark pattern identity determination. With this operation, the present embodiment can determine whether it is permissible to output the image data of the original image 101, regardless of the types of the original image.

The anti-copy document determination process of the CPU 204a in step S113 performs a post-anti-copy-document-detection operation when determining that the original document 101 read by the scanner 201 is an anti-copy document. In one example, the post-anti-copy-document-detection operation prohibits reproduction by the printer 203. In another example, the post-anti-copy-document-detection operation scrambles the image data of the anti-copy document read by the scanner 201 by, for example, changing the image data with a fixed density value (e.g., a level of white), for example, so that a reproduced output of the present anti-copy document from the printer 203 is filled in with a specific color (e.g., a white color) and becomes an unreadable image.

When the original image 101 read by the scanner 201 is determined as an anti-copy document, that is, the detected watermark pattern 103 is determined as matching the reference anti-copy document by the identity determination process, the CPU 204a prohibits the reproduction operation of the printer 203 with respect to the anti-copy document so determined by the CPU 204a. Thus, the CPU 204a prohibits the reproduction of the anti-copy document.

The CPU 204a, however, causes the printer 203 to perform the reproduction operation relative to the image data of the original image 101 stored in either the image memory of the RAM 204c or a specific memory area of the hard disc drive 315 when the original document 101 is determined as not an anti-copy document in the anti-copy document detection operation in step S113.

In the present procedure, the determination whether or not a watermark pattern embedded in an original image is an anti-copy watermark pattern depends on a threshold value. The threshold value serves as a permissible value relative to the original image having such anti-copy watermark pattern in the identity determination process. This identity determination process uses the dot density of the base area 104 or the message area 105 in the reference anti-copy watermark pattern stored in the nonvolatile memory or the battery-backed-up memory included in the RAM 204c. It also depends on another threshold value serving as a permissible value relative to the original image having such anti-copy watermark pattern in the identity determination process using the dot number of the base area 104 or the message area 105 in the reference anti-copy watermark pattern stored in the nonvolatile memory or the battery-backed-up memory included in the RAM 204c. Therefore, it becomes possible for the present procedure to arbitrarily designate a kind of an anti-copy watermark embedded in the original image by arbitrarily determining these threshold values.

Therefore, the present procedure may include a step of automatically generating the above-described threshold values for the dot density and the dot number in accordance with image data, when acquiring the image data of the watermark pattern 103 by reading the original image 101 or the original sheet 102 having the watermark pattern 103. The generated threshold values are registered as values of a reference anti-copy watermark pattern in the RAM 204c.

In this way, the present procedure may include the step of detecting a watermark pattern from the background image included in the image data of the original image 101 read by the scanner 201 and a step of registering the detected watermark pattern as an anti-copy watermark pattern in the RAM 204c. With this feature, the present procedure can register a desired watermark pattern as an anti-copy watermark pattern simply by reading the desired watermark pattern with the scanner 201.

Next, an exemplary structure of an image processing apparatus 4 according to another preferred embodiment of the present invention is explained with reference to FIGS. 11 and 12. As described above, the image processing apparatus 3 of FIGS. 9 and 10 executes an exemplary copy protection operation using a computer program loaded in hardware to detect the anti-copy document and to execute the copy protection based on this detection result. An example of this image processing apparatus 3 is a digital copying apparatus as in the case of the image processing apparatuses 1 and 2. A difference between the image processing apparatus 4 (FIG. 11) and the image processing apparatus 3 (FIG. 9) is a use of a personal computer as the hardware resources. However, the image processing apparatus 4 uses equivalent software resources for performing copy protection after detecting an anti-copy document to be implemented into the hardware resources, that is, the personal computer.

Figure 11:
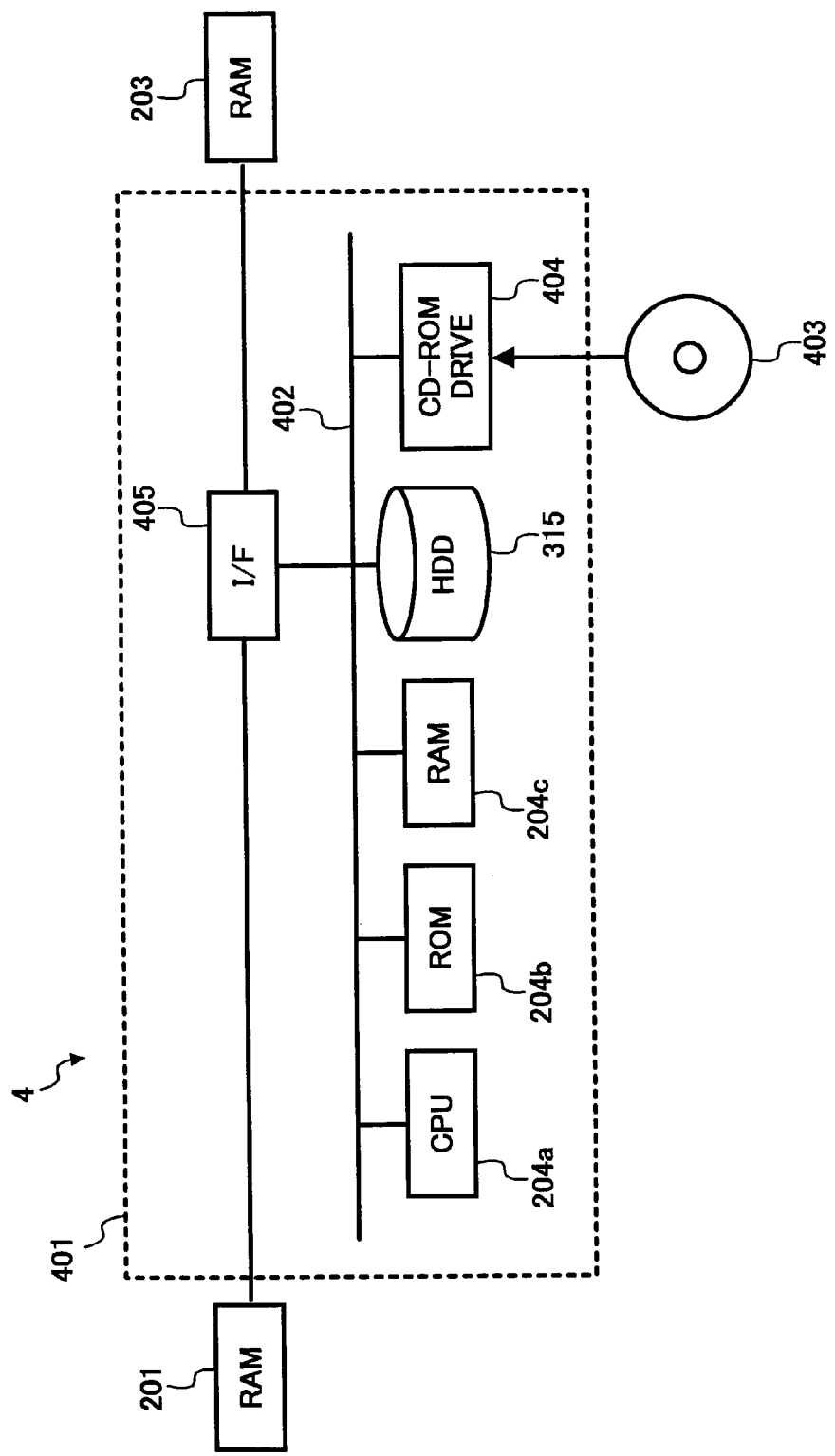
FIG. 11 is a schematic block diagram of an image processing apparatus according to another exemplary embodiment of the present invention.

As shown in FIG. 11, the image processing apparatus 4 is coupled to RAM in scanner 201 and RAM in printer 203, and includes a personal computer 401. The personal computer 401 includes the CPU 204a, the ROM 204b, the RAM 204c, the hard disc drive (HDD) 315, an internal bus 402, a CD-ROM (compact disc read only memory) drive 404, and an interface (I/F) 405. In the image processing apparatus 4, the scanner 201 and the printer 203 are equivalent to those shown in FIG. 6.

In the personal computer 401, the CPU 204a, the ROM 204b, and the RAM 204c are connected to each other via the internal bus 402 and form a microcomputer. The ROM 204b stores various programs including a BIOS (basic input output system). The RAM 204c is a rewritable memory and includes a working memory area for the CPU 204a to tentatively store various transaction data. The hard disc drive 315 stores various computer programs including an image processing program. The CD-ROM drive 404 reads data written in a CD-ROM 403 when the CD-ROM 403 is inserted into the CD-ROM drive 404. The interface 405 interfaces with the scanner 201 and the printer 203.

In one example, the image processing program installed in the hard disc drive 315 is a program initially stored on the CD-ROM 403 and loaded by the CPU 204*a* to the hard disc drive 315. When the CPU 204*a* starts the image processing program stored in the hard disc drive 315 is started, it first copies the image processing program in the RAM 204*c* and then executes the program. In this case, each of the RAM 204*c*, the hard disc drive 315, and the CD-ROM 303 is regarded as a data storing medium to store the computer programs including the image processing program.

As an alternative to using the CD-ROM 403 to store the computer programs, various kinds of medium can be used, such as optical discs including a DVD (digital versatile disc), magneto-optical discs, magnetic discs including a flexible disc, semiconductor memory, etc. It is also possible to install the computer programs in the hard disc drive 315 by downloading them from a data server serving as an external program resource through the Internet. In this case, a data storing device of the data server for storing the computer programs including the image processing program is regarded as a data storing medium to store the computer programs including the image processing program.

The above-mentioned image processing program may be a program running on a predetermined operating system, or a program included in a program file of series programs forming a predetermined application software such as a word-processing application or in a predetermined operating system.

Figures 12, 12A:
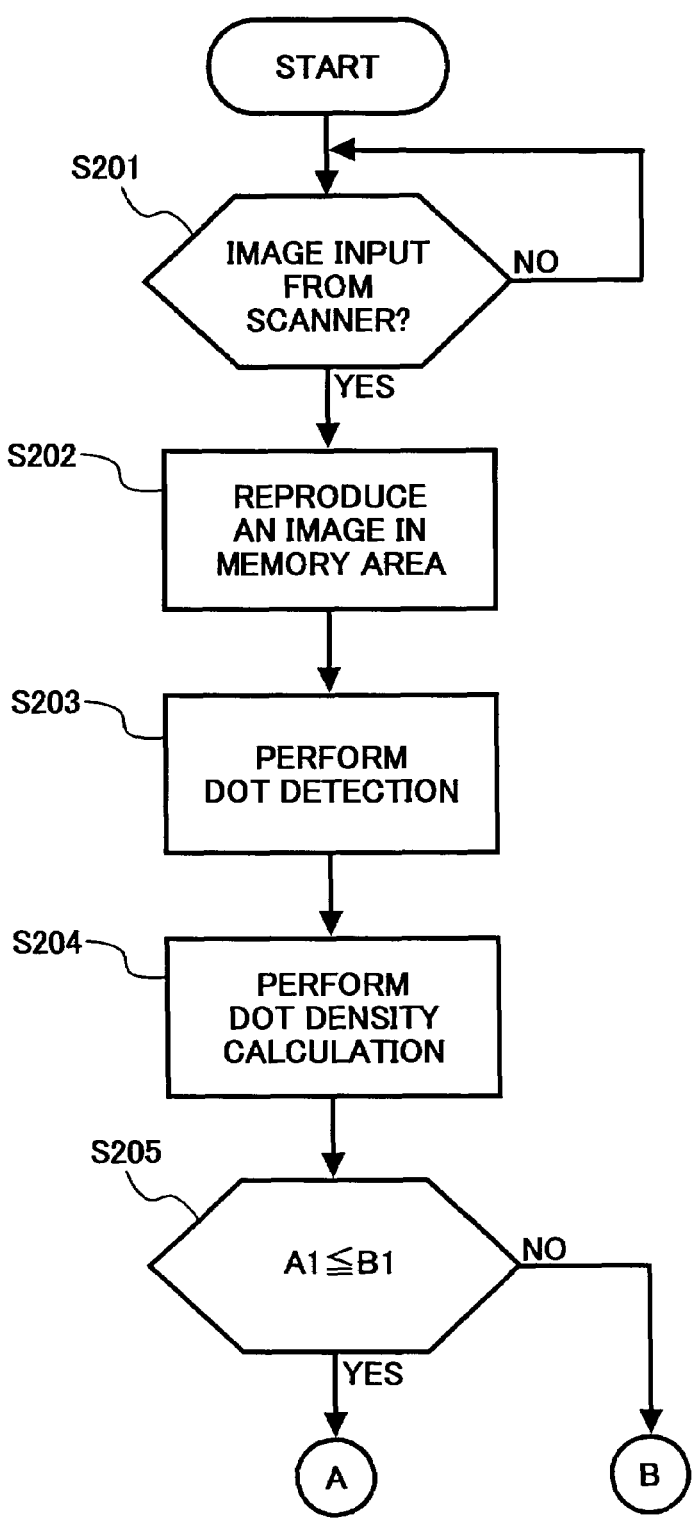
FIG. 12 (divided into FIGS. 12A and 12B) is a flowchart of an exemplary procedure for performing an anti-copy protection operation using the image processing apparatus of FIG. 11.
Figure 12B:
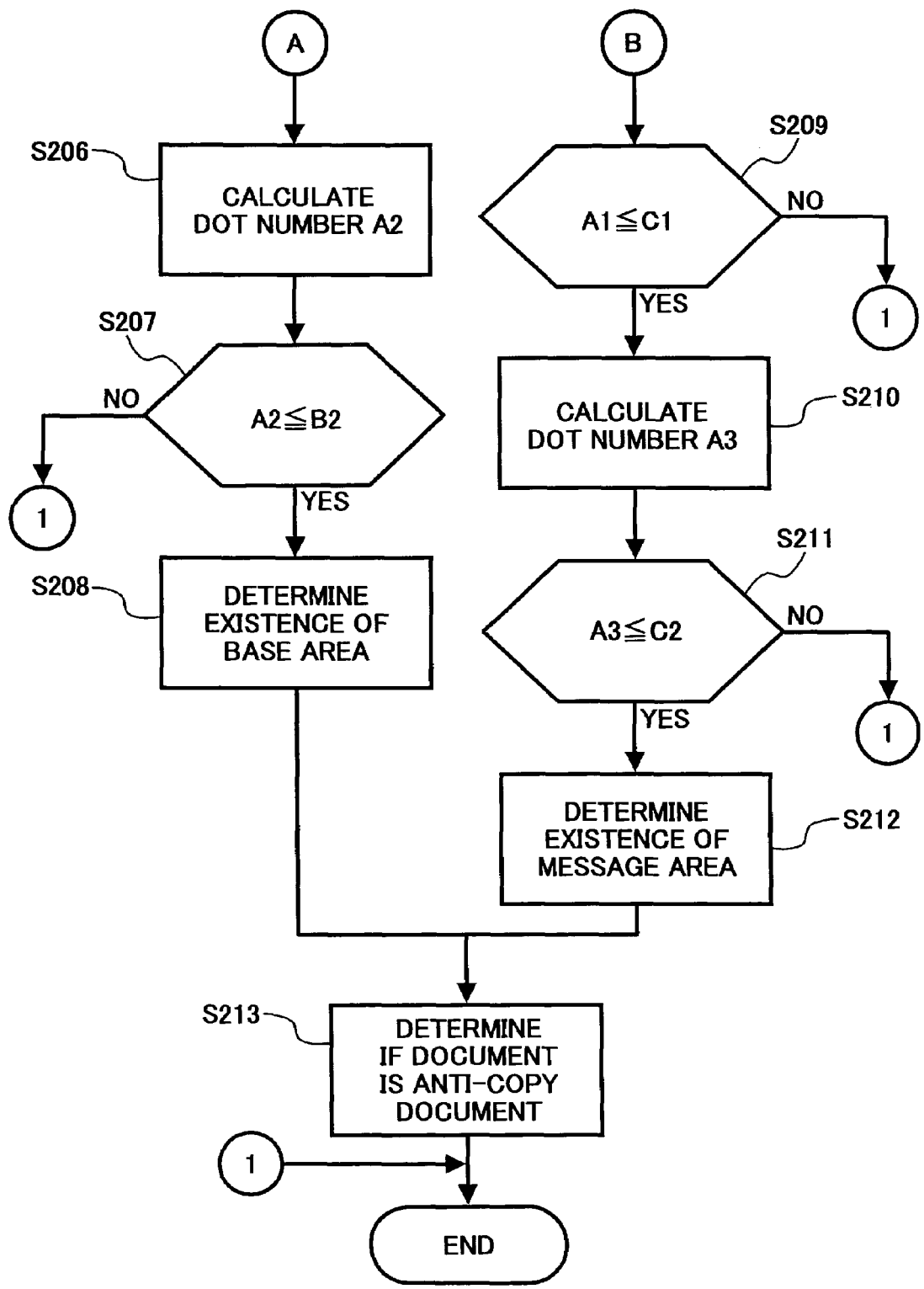

Referring to FIG. 12, an exemplary procedure of the copy protection operation performed by the image processing apparatus 4 is explained. In step S201 of FIG. 12, the CPU 204*a* of the system controller 204 repeatedly checks whether there is an input of image data read from the original image 101 by the scanner 201. This check operation is performed at a predetermined time interval. When the CPU 204*a* determines that image data is input and the check result of step S201 is YES, the CPU 204*a* stores the input image data into a memory area of the RAM 204*c* for storing image data, in step S202. Then, in step S203, the CPU 204*a* detects the dots 106 from the image data stored in the RAM 204*c*. An actual detection method may be one of various conventional methods for detecting images such as a pattern matching method. Then, in step S204, the CPU 204*a* calculates a dot density A1 in a specific unit area of the detected dots 106.

In this embodiment, the hard disc drive 315 stores data including a first base area threshold value B1, a second base area threshold value B2, a first message area threshold value C1 and a second message area threshold value C2. The first base area threshold value B1 is a permissible value used in an identity determination relative to a dot density in a specific unit area of the base area 104 in the reference watermark pattern 103 prepared as the background anti-copy dot pattern. The second base area threshold value B2 is a value used as a permissible value in an identity determination relative to a dot number in a specific unit area of the base area 104 in the reference watermark pattern 103 indicating the anti-copy mark which is included in the original sheet 102. The first message area threshold value C1 is a value used as a permissible value in the identity determination relative to a dot density in a specific unit area of the message area 105 in the reference watermark pattern 103 prepared as the background anti-copy dot pattern. The second message area threshold value C2 is a permissible value used in the identity determination relative to a dot number in a specific unit area of the message area 105 in the reference watermark pattern 103 indicating the anti-copy mark included in the original sheet 102. The CPU 204*a* can use the threshold values in the hard disc drive 315, or can use the threshold values copied to the RAM 204*c* together with the computer programs initially stored in the hard disc drive 315 and then copied to the RAM 204*c*.

In step S205, the CPU 204*a* determines whether the dot density A1 in a specific unit area of the dots 106 detected in step S204 is smaller than or equal to the first base area threshold value B1, stored in the hard disc drive 315 or the RAM 204*c*, where B1 is greater than the dot density of the base area 104 included in the watermark pattern 103. The CPU 204*a* executes step S209 when the CPU 204*a* determines that the dot density A1 in a specific unit area of the dots 106 detected in step S204 is not smaller than or equal to the first base area threshold value B1 and the determination result of step S205 becomes NO. In step S209, the CPU 204*a* determines whether the dot density A1 in a specific unit area of the dots 106 detected in step S204 is smaller than or equal to the first message area threshold value C1, stored in the hard disc drive 315 or the RAM 204*c*, where C1 is greater than the dot density of the message area 105 included in the watermark pattern 103.

When the CPU 204*a* determines that the dot density A1 in a specific unit area of the dots 106 detected in step S204 is smaller than the first base area threshold value B1 and the determination result of step S205 becomes YES, the CPU 204*a* performs a dot number calculation to accumulate the number of the detected dots 106, in step S206. As a result of the accumulation, an accumulated dot number A2 is generated and is stored in a registration memory area of the hard disc drive 315 or the RAM 204*c*, for example. Then, in step S207, the CPU 204*a* determines whether the accumulated dot number A2 is smaller than or equal to the second base area threshold value B2, stored in the hard disc drive 315 or the RAM 204*c*, where B2 is greater than the dot number in the base area 104 of the watermark pattern 103. When the accumulated dot number A2 is determined as smaller than or equal to the second base area threshold value B2 and the determination result of step S207 becomes YES, the CPU 204*a* judges that the base area 104 of the anti-copy watermark pattern 103 exists, in step S208. After that, the CPU 204*a* transmits data indicating this determination result to an anti-copy document determination procedure, in step S213.

When the accumulated dot number A2 is determined as not smaller than or equal to the second base area threshold value B2 and the determination result of step S207 becomes NO, the CPU 204*a* judges that the base area 104 of the anti-copy watermark pattern 103 does not exist and ends processing.

In step S209, when the dot density A1 in a specific unit area of the dots 106 detected in step S204 is smaller than or equal to the first message area threshold value C1 stored in the hard disc drive 315 or the RAM 204*c* and the determination result thereof becomes YES, the CPU 204*a* executes step S210. In step S210, the CPU 204*a* performs a dot number calculation to accumulate the number of detected dots 106. Accordingly, an accumulated dot number A3 is generated and stored in a registration memory area of the hard disc drive 315 or the RAM 204*c*, for example. Then, in step S211, the CPU 204*a* determines whether the accumulated dot number A3 is smaller than or equal to the second message area threshold value C2, stored in the hard disc drive 315 or the RAM 204*c*, where C2 is greater than the dot number in the message area 105 of the watermark pattern 103. When the accumulated dot number A3 is determined as smaller than or equal to the second message area threshold value C2 and the determination result of step S211 becomes YES, the CPU 204*a* determines that the message area 105 of the anti-copy watermark pattern 103 exists, in step S212. Next, CPU 204*a* transmits data indicating this determination result to an anti-copy document determination procedure, in step S213.

The CPU 204a will terminate processing in two cases. Processing will first terminate when the dot density A1 in a specific unit area of the dots 106 detected in step S204 is not smaller than or equal to the first message area threshold value C1 and the determination result thereof becomes NO. Processing will also terminate when the accumulated dot number A3 is determined as not smaller than or equal to the second message area threshold value C2 and the determination result of step S211 becomes NO.

In step S213, the CPU 204a performs the anti-document determination process with reference to a predetermined standard. This standard can be, for example, established by being input as parameters through the operation panel 205 and is stored in a nonvolatile memory and a battery-backed-up memory included in the RAM 204c. With the thus-prepared standard, in one example, the anti-copy document determination process of the CPU 204a in step S213 determines that the present document is an anti-copy document when determining that one of the base area 104 and the message area 105 of the watermark pattern 103 exists in the original image 101 read by the scanner 201. In another example, the anti-copy document determining process of the CPU 204a determines that the present document is an anti-copy document when determining that both of the base area 104 and the message area 105 of the watermark pattern 103 exist in the original image 101 read by the scanner 201.

Thus, the present embodiment detects from the image data the watermark pattern 103 embedded in the background image which is included in the image data of the original image 101. Then, the present embodiment compares the detected watermark pattern 103 to the prestored reference anti-copy watermark pattern, thereby performing the watermark pattern identity determination. With this operation, the present embodiment can determine whether it is permissible to output the image data of the original image 101, regardless of the types of the original image.

The anti-copy document determination process of the CPU 204a in step S213 performs a post-anti-copy-document-detection operation when determining that the original document 101 read by the scanner 201 is an anti-copy document. In one example, the post-anti-copy-document-detection operation prohibits the reproduction operation of the printer 203. In another example, the post-anti-copy-document-detection operation scrambles the image data of the anti-copy document read by the scanner 201 by, for example, changing the image data with a fixed density value (e.g., a level of white), for example, so that a reproduced output of the present anti-copy document from the printer 203 is filled in with a specific color (e.g., a white color) and becomes an unreadable image.

When the original image 101 read by the scanner 201 is determined as an anti-copy document, that is, the detected watermark pattern 103 is determined as matching the reference anti-copy document by the identity determination process. Accordingly, the CPU 204a prohibits the reproduction operation of the printer 203 with respect to the anti-copy document so determined by the CPU 204a. Thus, the CPU 204a prohibits the reproduction of the anti-copy document. The CPU 204a, however, causes the printer 203 to perform the reproduction operation relative to the image data of the original image 101 stored in either the image memory of the RAM 204c or a specific memory area of the hard disc drive 315 when the original document 101 is determined as not an anti-copy document in the anti-copy document detection operation in step S213.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed is:

1. An image processing apparatus, comprising:
a first pattern detecting mechanism configured to detect a background dot pattern embedded in a background image included in image data of an original image from the image data;
a second pattern detecting mechanism configured to detect a background dot pattern embedded in a background image included in image data of an original image from the image data and store the detected background dot pattern as an anti-copy background dot pattern in a memory; and
a pattern identity determining mechanism configured to compare the detected background dot pattern with the anti-copy background dot pattern stored in the memory and determine whether the detected background dot pattern is substantially identical to the anti-copy background dot pattern stored in the memory;
wherein the image data is data obtained by a reading of the original image with an original reading apparatus.

2. An image processing apparatus as defined in claim 1, wherein the pattern identity determining mechanism compares a quantitative characteristic of the detected background dot pattern with quantitative characteristic of the anti-copy background dot pattern stored in the memory.

3. An image processing apparatus as defined in claim 2, wherein the quantitative characteristic of the background dot pattern includes quantitative characteristic of a base area included in the background dot pattern.

4. An image processing apparatus as defined in claim 2, wherein the quantitative characteristic of the background dot pattern includes quantitative characteristic of a message area included in the background dot pattern.

5. An image processing apparatus as defined in claim 2, wherein the quantitative characteristic of the background dot pattern includes quantitative characteristic of a base area and a message area both included in the background dot pattern.

6. An image processing apparatus as defined in claim 2, wherein the pattern identity determining mechanism determines that the detected background dot pattern is substantially identical to the anti-copy background dot pattern when a difference between quantities of the detected background dot pattern and the anti-copy background dot pattern is smaller than a predetermined threshold value.

7. An image processing apparatus as defined in claim 6, further comprising an output preventing mechanism configured to prevent the image data from being output when the detected background dot pattern is determined as substantially identical to the anti-copy background dot pattern by the pattern identity determining mechanism.

8. An image processing apparatus as defined in claim 6, further comprising an output preventing mechanism configured to prevent the image data from being printed when the detected background dot pattern is determined as substantially identical to the anti-copy background dot pattern by the pattern identity determining mechanism.

9. An image processing apparatus, comprising:
first pattern detecting means for detecting a background dot pattern embedded in a background image included in image data of an original image from the image data;
a second pattern detecting means for detecting a background dot pattern embedded in a background image included in image data of an original image from the image data and storing the detected background dot pattern as an anti-copy background dot pattern in storing means; and
pattern identity determining means for comparing the detected background dot pattern with the anti-copy background dot pattern stored in the storing means and determining whether the detected background dot pattern is substantially identical to the anti-copy background dot pattern stored in the storing means.

10. An image processing apparatus as defined in claim 9, wherein the pattern identity determining means compares a quantitative characteristic of the detected background dot pattern with a quantitative characteristic of the anti-copy background dot pattern stored in the memory.

11. An image processing apparatus as defined in claim 10, wherein quantitative characteristic of the background dot pattern includes a quantitative characteristic of a base area included in the background dot pattern.

12. An image processing apparatus as defined in claim 10, wherein the quantitative characteristic of the background dot pattern includes a quantitative characteristic of a message area included in the background dot pattern.

13. An image processing apparatus as defined in claim 10, wherein the quantitative characteristic of the background dot pattern includes a quantitative characteristic of a base area and a message area both included in the background dot pattern.

14. An image processing apparatus as defined in claim 10, wherein the pattern identity determining means determines that the detected background dot pattern is identical to the anti-copy background dot pattern when a difference between quantities of the detected background dot pattern and the anti-copy background dot pattern is smaller than a predetermined threshold value.

15. An image processing apparatus as defined in claim 14, further comprising output preventing means for the image data from being output when the detected background dot pattern is determined as substantially identical to the anti-copy background dot pattern by the pattern identity determining means.

16. An image processing apparatus as defined in claim 14, further comprising output preventing means for the image data from being printed when the detected background dot pattern is determined as substantially identical to the anti-copy background dot pattern by the pattern identity determining means.

17. An image processing method, comprising:
providing image data of an original image;
detecting a first background dot pattern embedded in a background image included in the image data of the original image;
detecting a second background dot pattern embedded in a background image included in the image data of the original image;
storing the second detected background dot pattern as the anti-copy background dot pattern;
comparing the first detected background dot pattern with the stored anti-copy background dot pattern; and
determining whether the first detected background dot pattern is substantially identical to the stored anti-copy background dot pattern.

18. An image processing method as defined in claim 17, wherein the determining step compares a quantitative characteristic of the detected first background dot pattern with a quantitative characteristic of the anti-copy background dot pattern, and wherein the quantitative characteristic of the background dot pattern includes a quantitative characteristic of a base area and a message area both included in the background dot pattern.

19. An image processing method as defined in claim 17, wherein the determining step determines that the detected first background dot pattern is substantially identical to the anti-copy background dot pattern when a difference between quantities of the detected background dot pattern and the anti-copy background dot pattern is smaller than a predetermined threshold value.

20. An image processing method as defined in claim 19, further comprising a step of preventing the image data from being output when the detected first background dot pattern is determined as substantially identical to the anti-copy background dot pattern by the determining step.

21. An image processing method as defined in claim 19, further comprising a step of preventing the image data from being printed when the detected first background dot pattern is determined as substantially identical to the anti-copy background dot pattern by the determining step.

22. A computer readable medium storing computer instructions for performing an image processing method, comprising the steps of:
providing image data of an original image;
detecting a first background dot pattern embedded in a background image included in the image data of the original image;
detecting a second background dot pattern embedded in a background image included in image data of an original image;
storing the second detected background dot pattern as the anti-copy background dot pattern;
comparing the first detected background dot pattern with the stored anti-copy background dot pattern; and
determining that the first detected background dot pattern is substantially identical to the stored anti-copy background dot pattern.

23. A computer readable medium as defined in claim 22, wherein the image data is data obtained by a reading of the original image with an original reading apparatus.

24. A computer readable medium as defined in claim 23, wherein the original reading apparatus is a scanner included in an image processing apparatus.

25. A computer readable medium as defined in claim 22, wherein the determining step compares a quantitative characteristic of the detected background dot pattern with a quantitative characteristic of the anti-copy background dot pattern.

26. A computer readable medium as defined in claim 25, wherein the quantitative characteristic of the background dot pattern includes a quantitative characteristic of a base area included in the background dot pattern.

27. A computer readable medium as defined in claim 25, wherein the quantitative characteristic of the background dot pattern includes a quantitative characteristic of a message area included in the background dot pattern.

28. A computer readable medium as defined in claim 25, wherein the quantitative characteristic of the background dot pattern includes a quantitative characteristic of a base area and a message area both included in the background dot pattern.

29. A computer readable medium as defined in claim 25, wherein the determining step determines that the detected first background dot pattern is substantially identical to the anti-copy background dot pattern when a difference between quantities of the detected background dot pattern and the anti-copy background dot pattern is smaller than a predetermined threshold value.

30. A computer readable medium as defined in claim 29, wherein said method further comprises a step of preventing the image data from being output when the detected first background dot pattern is determined as substantially identical to the anti-copy background dot pattern by the determining step.

31. A computer readable medium as defined in claim 29, wherein said method further comprises a step of preventing the image data from being printed when the detected first background dot pattern is determined as substantially identical to the anti-copy background dot pattern by the determining step.

32. An image processing apparatus as defined in claim 1, wherein the first background dot pattern is generated together with the original image.

33. An image processing method as defined in claim 17, wherein the first background dot pattern is generated together with the original image.

34. A computer readable medium as defined in claim 22, wherein the first background dot pattern is generated together with the original image.

* * * * *

UNITED STATES PATENT AND TRADEMARK OFFICE
CERTIFICATE OF CORRECTION

PATENT NO. : 7,580,159 B2
APPLICATION NO. : 10/623603
DATED : August 25, 2009
INVENTOR(S) : Guan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1798 days.

Signed and Sealed this

Fourteenth Day of September, 2010

David J. Kappos
*Director of the United States Patent and Trademark Office*